United States Patent
Hu et al.

(10) Patent No.: US 10,487,167 B2
(45) Date of Patent: *Nov. 26, 2019

(54) FUNCTIONALIZED BLOCK COMPOSITE AND CRYSTALLINE BLOCK COMPOSITE COMPOSITIONS

(71) Applicant: Dow Global Technologies LLC, Midland, MI (US)

(72) Inventors: Yushan Hu, Pearland, TX (US); Kim L. Walton, Lake Jackson, TX (US); Gary R. Marchand, Maurepas, LA (US); Michael D. Read, Monroe, WA (US); H. Craig Silvis, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 6 days.

This patent is subject to a terminal disclaimer.

(21) Appl. No.: 15/451,633

(22) Filed: Mar. 7, 2017

(65) Prior Publication Data

US 2017/0198078 A1    Jul. 13, 2017

Related U.S. Application Data

(63) Continuation of application No. 14/364,482, filed as application No. PCT/US2012/069194 on Dec. 12, 2012, now abandoned.

(60) Provisional application No. 61/570,340, filed on Dec. 14, 2011.

(51) Int. Cl.
| | | |
|---|---|---|
| *C08F 287/00* | (2006.01) | |
| *C08L 53/00* | (2006.01) | |
| *C08L 51/06* | (2006.01) | |
| *C08L 51/00* | (2006.01) | |

(52) U.S. Cl.
CPC .......... *C08F 287/00* (2013.01); *C08L 51/003* (2013.01); *C08L 51/06* (2013.01); *C08L 53/00* (2013.01)

(58) Field of Classification Search
CPC ........ C08L 51/06; C08L 53/00; C08L 51/003; C08L 23/08; C08L 23/142; C08F 287/00
See application file for complete search history.

(56) References Cited

U.S. PATENT DOCUMENTS

| | | | |
|---|---|---|---|
| 3,697,465 A | 10/1972 | Joyner et al. | |
| 5,266,627 A | 11/1993 | Meverden et al. | |
| 5,717,039 A | 2/1998 | Cusumano et al. | |
| 5,814,708 A | 9/1998 | Frechet et al. | |
| 5,849,828 A | 12/1998 | Frechet et al. | |
| 5,869,591 A | 2/1999 | McKay et al. | |
| 5,911,940 A | 6/1999 | Walton et al. | |
| 5,977,271 A | 11/1999 | McKay et al. | |
| 6,124,370 A | 9/2000 | Walton et al. | |
| 7,355,089 B2 | 4/2008 | Chang et al. | |
| 7,622,529 B2 | 11/2009 | Walton et al. | |
| 7,897,689 B2 | 3/2011 | Harris et al. | |
| 7,951,882 B2 | 5/2011 | Arriola et al. | |
| 8,822,598 B2 | 9/2014 | Li Pi Shan et al. | |
| 9,303,156 B2 * | 4/2016 | Weeks | C08L 23/06 |
| 2005/0131160 A1 * | 6/2005 | Shimizu | C08F 297/08 |
| | | | 525/242 |
| 2006/0199930 A1 | 9/2006 | Li Pi Shan et al. | |
| 2007/0167578 A1 | 7/2007 | Arriola et al. | |
| 2007/0197731 A1 * | 8/2007 | Kondo | C08L 23/10 |
| | | | 525/192 |
| 2008/0269412 A1 | 10/2008 | Carnahan et al. | |
| 2008/0311812 A1 | 12/2008 | Arriola et al. | |
| 2009/0186985 A1 | 7/2009 | Kuhlman et al. | |
| 2010/0093942 A1 | 4/2010 | Silvis et al. | |
| 2010/0143651 A1 | 6/2010 | Silvis et al. | |
| 2010/0197880 A1 | 8/2010 | Shan et al. | |
| 2011/0082249 A1 | 4/2011 | Shan et al. | |
| 2011/0082257 A1 | 4/2011 | Carnahan et al. | |
| 2011/0082258 A1 | 4/2011 | Walton et al. | |
| 2011/0313106 A1 | 12/2011 | Shan et al. | |
| 2011/0313107 A1 | 12/2011 | Shan et al. | |

(Continued)

FOREIGN PATENT DOCUMENTS

| | | |
|---|---|---|
| EP | 0110505 A1 | 6/1984 |
| GB | 2226035 A | 6/1990 |

(Continued)

OTHER PUBLICATIONS

PCT/US20212/069194, Mar. 25, 2013, International Search Report and Written Opinion.
PCT/US20212/069194, Jun. 26, 2014, International Preliminary Report on Patentability.
Dow Global Technologies LLC Singapore Application No. 10201509914V dated Aug. 8, 2017.

*Primary Examiner* — Jeffrey C Mullis

(57) ABSTRACT

The invention provides functionalized block composites and crystalline block composites. In particular, the invention provides a functionalized olefin-based polymer formed from at least (A) and (B): (A) a crystalline block composite comprising: a block copolymer comprising a propylene-based crystalline block and crystalline ethylene-based block; a propylene-based crystalline polymer; and, a crystalline ethylene-based polymer; and (B) at least one functionalization agent or a functionalized olefin-based polymer formed from at least (A) and (B): (A) a crystalline block composite comprising: a block copolymer comprising a propylene-based crystalline block and crystalline ethylene-based block; a propylene-based crystalline polymer; and, a crystalline ethylene-based polymer; and (B) at least one functionalization agent.

5 Claims, 10 Drawing Sheets

(56) References Cited

U.S. PATENT DOCUMENTS

| | | |
|---|---|---|
| 2011/0313108 A1 | 12/2011 | Shan et al. |
| 2012/0208946 A1 | 8/2012 | Shan et al. |
| 2012/0208962 A1 | 8/2012 | Walton et al. |
| 2014/0174509 A1* | 6/2014 | Bonekamp .............. B32B 27/32 136/251 |

FOREIGN PATENT DOCUMENTS

| | | |
|---|---|---|
| JP | 10044701 A | 2/1998 |
| JP | 2012-148806 A | 8/2012 |
| WO | 2006/102016 A2 | 9/2006 |
| WO | 2013/090393 A1 | 6/2013 |

* cited by examiner

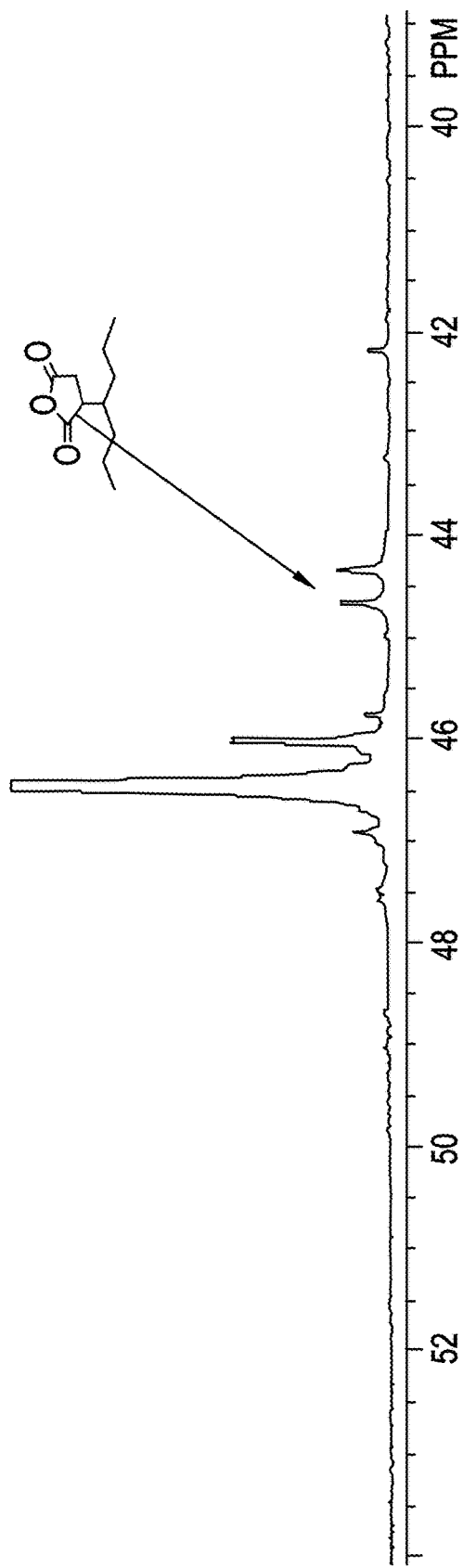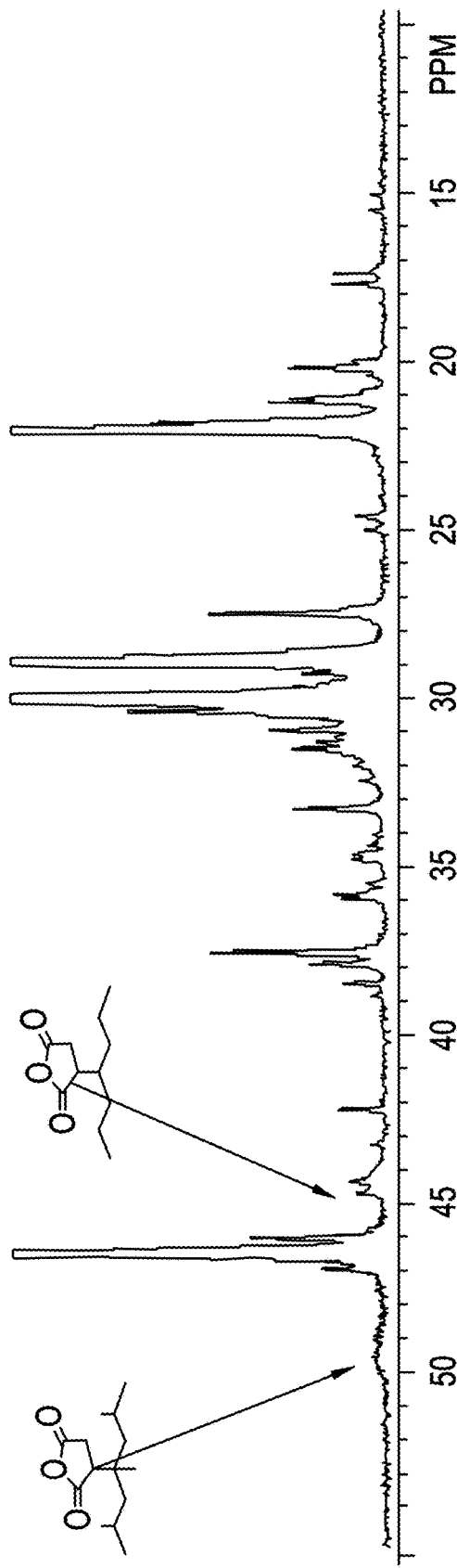

FUNCTIONALIZED BLOCK COMPOSITE AND CRYSTALLINE BLOCK COMPOSITE COMPOSITIONS

FIELD OF THE INVENTION

This invention relates to functionalized block composites and functionalized crystalline block composites.

BACKGROUND OF THE INVENTION

Despite advances in the polyolefin industry, there remains a need to develop compatibilizing agents for compatibilizing incompatible polymer blends; and thus, which can be used to develop new polymer alloys. Many consumer and industrial products are formed from multiple thermoplastic materials. Some commonly used polymers include non polar polyolefins, such as polypropylene (PP) and polyethylene (PE) and polar polymers such polyamides, polyesters, polyurethanes and polycarbonates. Maleated polymers are a useful class of compatibilizing agents for thermoplastic polymers. Such polymers include maleic anhydride-grafted PP, PE and ethylene copolymers. However, such maleated polyolefins are typically used as compatibilizers for PP/polar polymer systems or PE/polar polymer systems; they have not been used in PP/PE/polar polymer systems due to the inherent incompatibility of PP/PE/polar polymer.

In addition, there is a need to develop polyolefins for use in coatings, adhesive and tie layer applications, where such polyolefins provide strong adhesion to polar and/or non-polar substrates, improve paintability and/or printability, provide good flexibility, and provide structural and chemical stability over a broad service temperature range.

U.S. Pat. No. 7,897,689 relates to functionalized interpolymers derived from base olefin interpolymers, which are prepared by polymerizing one or more monomers or mixtures of monomers, such as ethylene and one or more comonomers, to form an interpolymer product having unique physical properties. The functionalized olefin interpolymers contain two or more differing regions or segments (blocks), resulting in unique processing and physical properties.

US Patent Application Publication No. US2010-0093942 relates to polyolefin blend compositions of polar and/or non-polar polymers, with at least one functionalized polyolefin polymer selected from the group consisting of: amine functionalized, hydroxyl functionalized, imide functionalized, anhydride functionalized, or carboxylic acid functionalized polyolefin polymers. Also disclosed are methods for making the functionalized polyolefin polymer and materials and articles containing at least one component prepared from such compositions U.S. Pat. No. 7,622,529 relates to olefin interpolymers as compatiblizers, which are prepared by polymerizing one or more monomers or mixtures of monomers, such as ethylene and one or more comonomers, to form an interpolymer product having unique physical properties. The olefin interpolymers contain two or more differing regions or segments (blocks), resulting in unique processing and physical properties.

WO/2011/041696 relates to block composites and their use as impact modifiers; WO/2011/041698 relates to block composites in soft compounds; and WO/2011/041699 relates to block composites in thermoplastic vulcanisates.

SUMMARY

The invention provides a composition comprising a functionalized olefin-based polymer formed from at least (A) and (B):

(A) a block composite comprising:
   i) a block copolymer comprising a propylene-based crystalline block and an ethylene/α-olefin block;
   ii) a propylene-based crystalline polymer; and,
   iii) an ethylene/α-olefin polymer; and
(B) at least one functionalization agent.

The invention also provides a composition comprising a functionalized olefin-based polymer formed from at least (A) and (B):

(A) a crystalline block composite comprising:
   i) a block copolymer comprising a crystalline propylene-based block and an crystalline ethylene-based block;
   ii) a crystalline propylene-based polymer; and,
   iii) an crystalline ethylene-based polymer; and
(B) at least one functionalization agent.

BRIEF DESCRIPTION OF THE DRAWINGS

FIG. 9A shows the 13C NMR spectrum for 13C-labeled MAH grafted CBC5.
FIG. 9B shows the 13C NMR spectrum for 13C-labeled MAH grafted CBC6.

DETAILED DESCRIPTION

Figure 1:
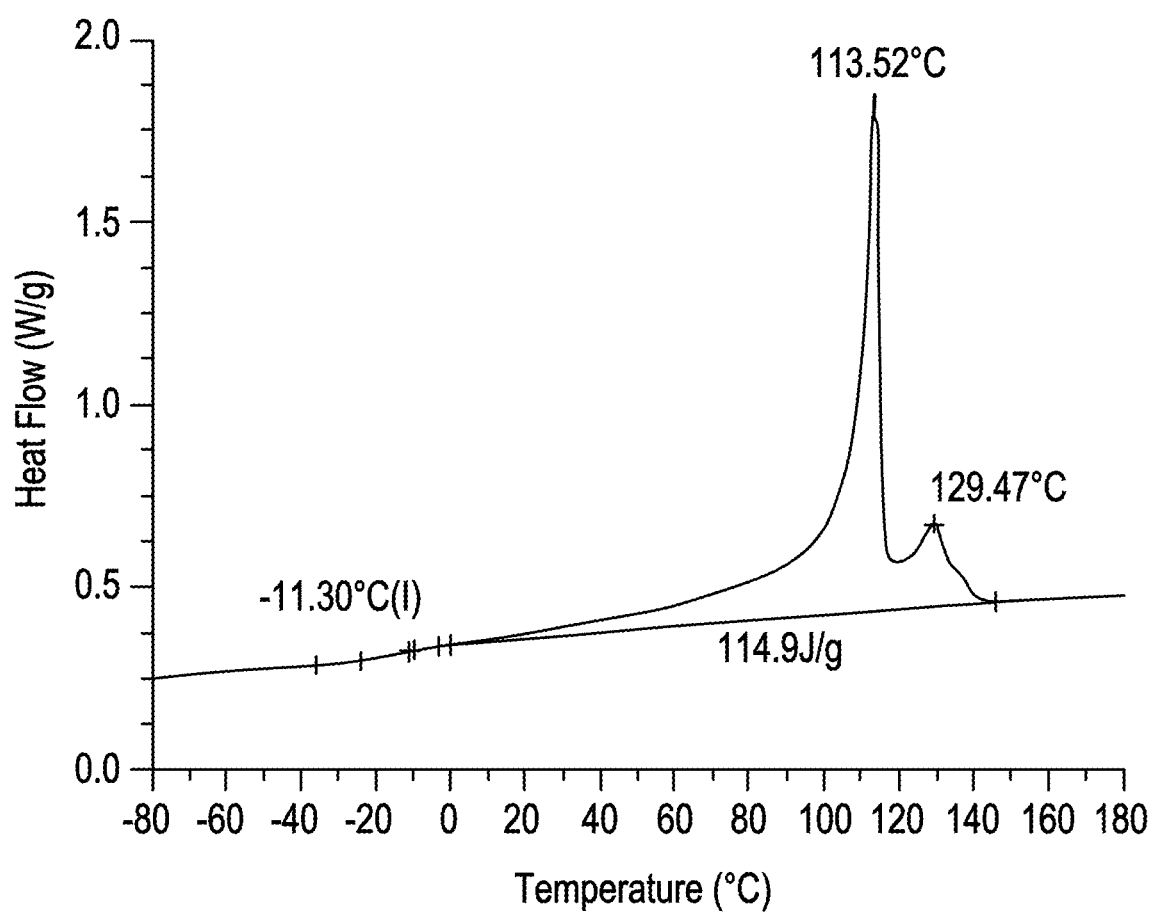
FIG. 1 shows the DSC profile for CBC2.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The invention provides functionalized derivatives of block composites (BC) and crystalline block composites (CBC), as described herein, and provides for compositions comprising the same. The functionalized BCs and CBCs of this invention often exhibit improved grafting efficiency and minimal molecular weight change as a result of the functionalization process. The invention also provides methods of using these functionalized BCs and CBCs in applications requiring unique combinations of processing elements and unique physical properties in the final product. In still another aspect, the invention provides the articles prepared from these functionalized BCs and CBCs.

The term "polyethylene" includes homopolymers of ethylene and copolymers of ethylene and one or more $C_{3-8}$ α-olefins in which ethylene comprises at least 50 mole percent.

The term "polypropylene" includes homopolymers of propylene such as isotactic polypropylene, syndiotactic polypropylene, and copolymers of propylene and one or more $C_{2, 4-8}$ α-olefins in which propylene comprises at least 50 mole percent.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers typically have, but are not limited to, densities of 0.88 g/cc to 0.91 g/cc and melting points of 100° C. to 170° C.

The term "amorphous" refers to a polymer lacking a crystalline melting point.

The term "isotactic" is defined as polymer repeat units having at least 70 percent isotactic pentads as determined by $^{13}$C-NMR analysis. "Highly isotactic" is defined as polymers having at least 90 percent isotactic pentads.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In a preferred embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the invention are characterized by unique distributions of both polymer polydispersity (PDI or Mw/Mn) and block length distribution, due, in a preferred embodiment, to the effect of a shuttling agent(s) in combination with the catalyst(s).

The term "block composite" refers to polymers comprising a soft copolymer, polymerized units in which the comonomer content is greater than 10 mol % and less than 90 mol % and preferably greater than 20 mol % and less than 80 mol %, and most preferably greater than 33 mol % and less than 75 mol %, a hard polymer, in which the monomer is present in an amount greater than 90 mol % and up to 100 mol %, and preferably greater than 93 mol % and up to 100 mol %, and more preferably greater than 95 mol % and up to 100 mol %, and most preferably greater than 98 mol % and up to mol %, and a block copolymer, preferably a diblock, having a soft segment and a hard segment, wherein the hard segment of the block copolymer is essentially the same composition as the hard polymer in the block composite and the soft segment of the block copolymer is essentially the same composition as the soft copolymer of the block composite. The block copolymers can be linear or branched. More specifically, when produced in a continuous process, the block composites desirably possess PDI from 1.7 to 15, preferably from 1.8 to 3.5, more preferably from 1.8 to 2.2, and most preferably from 1.8 to 2.1. When produced in a batch or semi-batch process, the block composites desirably possess PDI from 1.0 to 2.9, preferably from 1.3 to 2.5, more preferably from 1.4 to 2.0, and most preferably from 1.4 to 1.8. Such block composites are described in, for example, US Patent Application Publication Nos US2011-0082257, US2011-0082258 and US2011-0082249, all published on Apr. 7, 2011 and incorporated herein by reference with respect to descriptions of the block composites, processes to make them and methods of analyzing them.

The term "crystalline block composite" (CBC) refers to polymers comprising a crystalline ethylene based polymer (CEP), a crystalline alpha-olefin based polymer (CAOP), and a block copolymer having a crystalline ethylene block (CEB) and a crystalline alpha-olefin block (CAOB), wherein the CEB of the block copolymer is essentially the same composition as the CEP in the block composite and the CAOB of the block copolymer is essentially the same composition as the CAOP of the block composite. Additionally, the compositional split between the amount of CEP and CAOP will be essentially the same as that between the corresponding blocks in the block copolymer. The block copolymers can be linear or branched. More specifically, each of the respective block segments can contain long chain branches, but the block copolymer segment is substantially linear as opposed to containing grafted or branched blocks. When produced in a continuous process, the crystalline block composites desirably possess PDI from 1.7 to 15, preferably 1.8 to 10, preferably from 1.8 to 5, more preferably from 1.8 to 3.5. Such crystalline block composites are described in, for example, U.S. Provisional Application Ser. Nos. 61/356,978, 61/356,957 and 61/356,990, all filed on Jun. 21, 2010 and incorporated herein by reference with respect to descriptions of the block composites, processes to make them and methods of analyzing them.

CAOB refers to highly crystalline blocks of polymerized alpha olefin units in which the monomer is present in an amount greater than 90 mol %, preferably greater than 93 mol percent, more preferably greater than 95 mol percent, and preferably greater than 96 mol percent. In other words, the comonomer content in the CAOBs is less than 10 mol percent, and preferably less than 7 mol percent, and more preferably less than 5 mol percent, and most preferably less than 4 mol %. CAOBs with propylene crystallinity have corresponding melting points that are 80° C. and above, preferably 100° C. and above, more preferably 115° C. and above, and most preferably 120° C. and above. In some embodiments, the CAOB comprise all or substantially all propylene units. CEB, on the other hand, refers to blocks of polymerized ethylene units in which the comonomer content is 10 mol % or less, preferably between 0 mol % and 10 mol %, more preferably between 0 mol % and 7 mol % and most preferably between 0 mol % and 5 mol %. Such CEB have corresponding melting points that are preferably 75° C. and above, more preferably 90° C., and 100° C. and above.

"Hard" segments refer to highly crystalline blocks of polymerized units in which the monomer is present in an amount greater than 90 mol percent, and preferably greater than 93 mol percent, and more preferably greater than 95 mol percent, and most preferably greater than 98 mol percent. In other words, the comonomer content in the hard segments is most preferably less than 2 mol percent, and more preferably less than 5 mol percent, and preferably less than 7 mol percent, and less than 10 mol percent. In some embodiments, the hard segments comprise all or substantially all propylene units. "Soft" segments, on the other hand, refer to amorphous, substantially amorphous or elastomeric blocks of polymerized units in which the comonomer content is greater than 10 mol % and less than 90 mol % and preferably greater than 20 mol % and less than 80 mol %, and most preferably greater than 33 mol % and less than 75 mol %.

The block composite and crystalline block composite polymers are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions. In a preferred embodiment, the block composites of the invention comprise a fraction of block polymer which possesses a most probable distribution of block lengths.

Suitable processes useful in producing the block composites and crystalline block composites may be found, for example, in US Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

When producing a block polymer having a crystalline ethylene block (CEB) and a crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It is more advantageous to produce CEB in the first reactor or zone with fresh chain shuttling agent added. The presence of increased levels of ethylene in the reactor or zone producing CEB will typically lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carryover of ethylene from the first reactor to the second reactor (in series) or from the second reactor back to the first reactor through a solvent and monomer recycle system is preferably minimized There are many possible unit operations to remove this ethylene, but because ethylene is more volatile than higher alpha olefins one simple way is to remove much of the unreacted ethylene through a flash step by reducing the pressure of the effluent of the reactor producing CEB and flashing off the ethylene. A more preferable approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

Suitable catalysts and catalyst precursors for use in the present invention include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts.

Particularly preferred catalysts are those of the following formula:

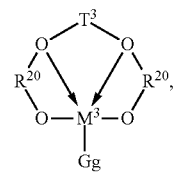

where:
$R^{20}$ is an aromatic or inertly substituted aromatic group containing from 5 to 20 atoms not counting hydrogen, or a polyvalent derivative thereof;
$T^3$ is a hydrocarbylene or silane group having from 1 to 20 atoms not counting hydrogen, or an inertly substituted derivative thereof;
$M^3$ is a Group 4 metal, preferably zirconium or hafnium;
G is an anionic, neutral or dianionic ligand group; preferably a halide, hydrocarbyl or dihydrocarbylamide group having up to 20 atoms not counting hydrogen;
g is a number from 1 to 5 indicating the number of such G groups; and
bonds and electron donative interactions are represented by lines and arrows respectively.

Preferably, such complexes correspond to the formula:

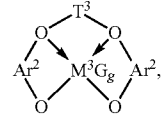

wherein: T³ is a divalent bridging group of from 2 to 20 atoms not counting hydrogen, preferably a substituted or unsubstituted, C₃₋₆ alkylene group; and Ar² independently each occurrence is an arylene or an alkyl- or aryl-substituted arylene group of from 6 to 20 atoms not counting hydrogen;

M³ is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows.

Preferred examples of metal complexes of foregoing formula include the following compounds:

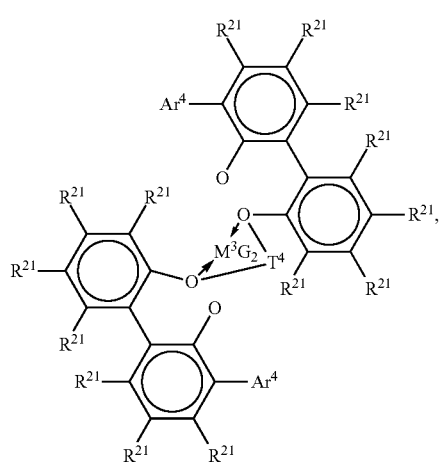

where M³ is Hf or Zr;

Ar⁴ is C₆₋₂₀ aryl or inertly substituted derivatives thereof, especially 3,5-di(isopropyl)phenyl, 3,5-di(isobutyl)phenyl, dibenzo-1H-pyrrole-1-yl, or anthracen-5-yl, and T⁴ independently each occurrence comprises a C₃₋₆ alkylene group, a C₃₋₆ cycloalkylene group, or an inertly substituted derivative thereof;

R²¹ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

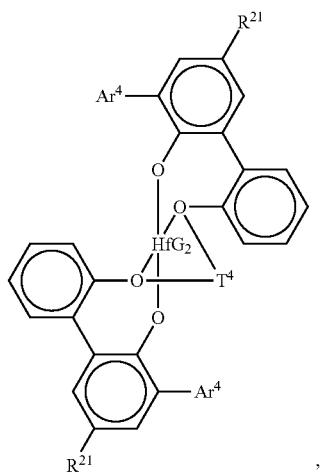

wherein Ar⁴ is 3,5-di(isopropyl)phenyl, 3,5-di(isobutyl)phenyl, dibenzo-1H-pyrrole-1-yl, or anthracen-5-yl, R²¹ is hydrogen, halo, or C₁₋₄ alkyl, especially methyl T⁴ is propan-1,3-diyl or butan-1,4-diyl, and G is chloro, methyl or benzyl.

Other suitable metal complexes are those of the formula:

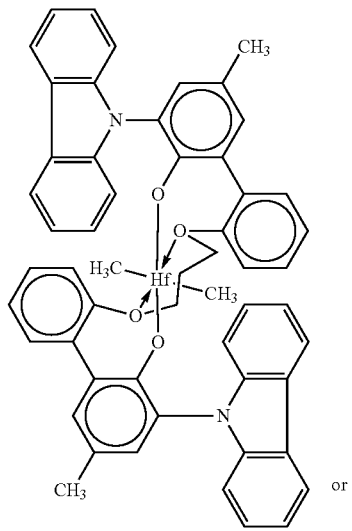

or

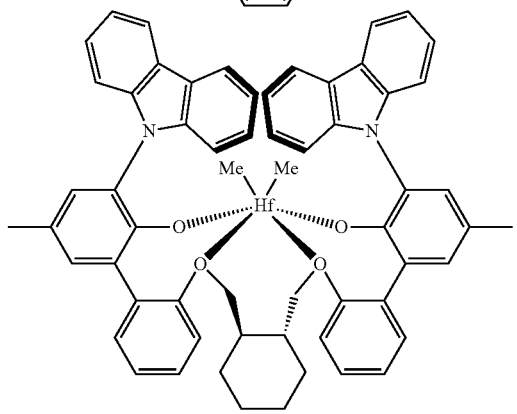

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, 6,953,764 and International Publication Nos WO 02/38628 and WO 03/40195.

Suitable co-catalysts are those disclosed in WO2005/090426, in particular, those disclosed on page 54, line 1 to page 60, line 12, which is herein incorporated by reference.

Suitable chain shuttling agents are those disclosed in WO2005/090426, in particular, those disclosed on page 19, line 21 through page 20 line 12, which is herein incorporated by reference. Particularly preferred chain shuttling agents are dialkyl zinc compounds.

Preferably, the block composite polymers comprise propylene, 1-butene or 4-methyl-1-pentene and one or more comonomers. Preferably, the block polymers of the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. Preferably, the monomer is propylene and the comonomer is ethylene.

Comonomer content in the resulting block composite polymers may be measured using any suitable technique, with techniques based on nuclear magnetic resonance (NMR) spectroscopy preferred. It is highly desirable that some or all of the polymer blocks comprise amorphous or relatively amorphous polymers such as copolymers of propylene, 1-butene or 4-methyl-1-pentene and a comonomer, especially random copolymers of propylene, 1-butene or 4-methyl-1-pentene with ethylene, and any remaining polymer blocks (hard segments), if any, predominantly comprise propylene, 1-butene or 4-methyl-1-pentene in polymerized form. Preferably such segments are highly crystalline or stereospecific polypropylene, polybutene or poly-4-methyl-1-pentene, especially isotactic homopolymers. Additional suitable comonomers are selected from diolefins, cyclic olefins, and cyclic diolefins, halogenated vinyl compounds, and vinylidene aromatic compounds.

In the case wherein the comonomer is ethylene, it is preferably present in an amount of 10 mol % to 90 mol %, more preferably from 20 mol % to 80 mol %, and most preferably from 33 mol % to 75 mol % percent. Preferably, the copolymers comprise hard segments that are 90 mol % to 100 mol % propylene. The hard segments can be greater than 90 mol % preferably greater than 93 mol % and more preferably greater than 95 mol % propylene, and most preferably greater than 98 mol % propylene. Such hard segments have corresponding melting points that are 80° C. and above, preferably 100° C. and above, more preferably 115° C. and above, and most preferably 120° C. and above.

In some embodiments, the block composites of the invention have a Block Composite Index (BCI), as defined below, that is greater than zero but less than about 0.4 or from about 0.1 to about 0.3. In other embodiments, BCI is greater than about 0.4 and up to about 1.0. Additionally, the BCI can be in the range of from about 0.4 to about 0.7, from about 0.5 to about 0.7, or from about 0.6 to about 0.9. In some embodiments, BCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, BCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

The block composites and crystalline block composites preferably have a Tm greater than 100° C., preferably greater than 120° C., and more preferably greater than 125° C. Preferably the Tm is in the range of from 100° C. to 250° C., more preferably from 120° C. to 220° C. and also preferably in the range of from 125° C. to 220° C. Preferably the MFR of the block composites and crystalline block composites is from 0.1 to 1000 dg/min, more preferably from 0.1 to 50 dg/min and more preferably from 0.1 to 30 dg/min.

Further preferably, the block composites and crystalline block composites have a weight average molecular weight (Mw) from 10,000 to about 2,500,000, preferably from 35,000 to about 1,000,000 and more preferably from 50,000 to about 300,000, preferably from 50,000 to about 200,000.

Comonomer content in the resulting block composite polymers may be measured using any suitable technique, with techniques based on nuclear magnetic resonance (NMR) spectroscopy preferred.

Preferably the block composite polymers of the invention comprise from 0.5 to 95 wt % soft copolymer, from 0.5 to 95 wt % hard polymer and from 5 to 99 wt % block copolymer. More preferably, the block composite polymers comprise from 0.5 to 79 wt % soft copolymer, from 0.5 to 79 wt % hard polymer and from 20 to 99 wt % block copolymer and more preferably from 0.5 to 49 wt % soft copolymer, from 0.5 to 49 wt % hard polymer and from 50 to 99 wt % block copolymer. Weight percents are based on total weight of block composite. The sum of the weight percents of soft copolymer, hard polymer and block copolymer equals 100%.

Preferably the crystalline block composite polymers of the invention comprise from 0.5 to 95 wt % CEP, from 0.5 to 95 wt % CAOP and from 5 to 99 wt % block copolymer. More preferably, the crystalline block composite polymers comprise from 0.5 to 79 wt % CEP, from 0.5 to 79 wt % CAOP and from 20 to 99 wt % block copolymer and more preferably from 0.5 to 49 wt % CEP, from 0.5 to 49 wt % CAOP and from 50 to 99 wt % block copolymer. Weight percents are based on total weight of crystalline block composite. The sum of the weight percents of CEP, CAOP and block copolymer equals 100%.

Preferably, the block copolymers of the block composite comprise from 5 to 95 weight percent soft blocks and 95 to 5 wt percent hard blocks. They may comprise 10 wt % to 90 wt % soft blocks and 90 wt % to 10 wt % hard blocks. More preferably, the block copolymers comprise 25 to 75 wt % soft blocks and 75 to 25 wt % hard blocks, and even more preferably they comprise 30 to 70 wt % soft blocks and 70 to 30 wt % hard blocks.

Preferably, the block copolymers of the crystalline block composite comprise from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. More preferably, the block copolymers comprise 25 to 75 wt % CEB and 75 to 25 wt % CAOB, and even more preferably they comprise 30 to 70 wt % CEB and 70 to 30 wt % CAOB.

In some embodiments, the crystalline block composites have a Crystalline Block Composite Index (CBCI), as defined below, that is greater than zero but less than about 0.4 or from about 0.1 to about 0.3. In other embodiments, CBCI is greater than about 0.4 and up to about 1.0. In some embodiments, the CBCI is in the range of from about 0.1 to about 0.9, from about 0.1 to about 0.8, from about 0.1 to about 0.7 or from about 0.1 to about 0.6. Additionally, the CBCI can be in the range of from about 0.4 to about 0.7, from about 0.5 to about 0.7, or from about 0.6 to about 0.9. In some embodiments, CBCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, CBCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Some embodiments of the present invention comprise compositions comprising from 98 to 0.5 wt % crystalline block composite and/or block composite with the remainder being polyethylene, polyalpha-olefin, and combinations thereof. Preferably, the compositions comprise 50 to 0.5 wt % CBC and/or BC and more preferably 15 to 0.5 wt % CBC and/or BC.

Preferred suitable BC and/or CBC resin(s) will have heat of fusion values at least about 50 Joules per gram (J/g), more preferably at least about 75 J/g, still more preferably at least about 85 J/g, and most preferably at least about 90 J/g, as measured by DSC.

The block composites and crystalline block composites may be modified by, for example, grafting, hydrogenation, nitrene insertion reactions, or other functionalization reactions using functionalization agents such as those known to those skilled in the art. Preferred functionalizations are grafting reactions using a free radical mechanism.

A variety of radically graftable species as functionalization agents may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

Radically graftable species of the silane class of materials may be attached to the polymer, either individually, or as relatively short grafts. These species include, but are not limited to, vinylalkoxysilanes, vinyltrimethoxysilane, vinyltriethoxysilane, vinyltriacetoxysilane, vinyltrichlorosilane, and the like. Generally, materials of this class include, but are not limited to, hydrolyzable groups, such as alkoxy, acyloxy, or halide groups, attached to silicon. Materials of this class also include non-hydrolyzable groups, such as alkyl and siloxy groups, attached to silicon.

Other radically graftable species may be attached to the polymer, individually, or as short-to-longer grafts. These species include, but are not limited to, methacrylic acid; acrylic acid; Diels-Alder adducts of acrylic acid; methacrylates including methyl, ethyl, butyl, isobutyl, ethylhexyl, lauryl, stearyl, hydroxyethyl, and dimethylaminoethyl; acrylates including methyl, ethyl, butyl, isobutyl, ethylhexyl, lauryl, stearyl, and hydroxyethyl; glycidyl methacrylate; trialkoxysilane methacrylates, such as 3-(methacryloxy)propyltrimethoxysilane and 3-(methacryloxy)propyl-triethoxysilane, methacryloxymethyltrimethoxysilane, methacryloxymethyltriethoxysilane; acrylonitrile; 2-isopropenyl-2-oxazoline; styrene; α-methylstyrene; vinyltoluene; dichlorostyrene; N-vinylpyrrolidinone, vinyl acetate, methacryloxypropyltrialkoxysilanes, methacryloxymethyltrialkoxysilanes and vinyl chloride.

Mixtures of radically graftable species that comprise at least one of the above species may be used, with styrene/maleic anhydride and styrene/acrylonitrile as illustrative examples.

A thermal grafting process is one method for reaction, however, other grafting processes may be used, such as photo initiation, including different forms of radiation, e-beam, or redox radical generation.

The functionalized interpolymers disclosed herein may also be modified by various chain extending or cross-linking processes, including, but not limited to peroxide-, silane-, sulfur-, radiation-, or azide-based cure systems. A full description of the various cross-linking technologies is described in U.S. Pat. Nos. 5,869,591 and 5,977,271, both of which are herein incorporated by reference in their entirety.

Suitable curing agents may include peroxides, phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. Elemental sulfur may be used as a crosslinking agent for diene containing polymers.

In some systems, for example, in silane grafted systems, crosslinking may be promoted with a crosslinking catalyst, and any catalyst that will provide this function can be used in this invention. These catalysts generally include acids and bases, especially organic bases, carboxylic acids and sulfonic acids, and organometallic compounds including organic titanates, organic zirconates, and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, are examples of suitable crosslinking catalysts.

Rather than employing a chemical crosslinking agent, crosslinking may be effected by use of radiation or by the use of electron beam. Useful radiation types include ultraviolet (UV) or visible radiation, beta ray, gamma rays, X-rays, or neutron rays. Radiation is believed to effect crosslinking by generating polymer radicals which may combine and crosslink.

Dual cure systems, which use a combination of heat, moisture cure, and radiation steps, may be effectively employed. Dual cure systems are disclosed in U.S. Pat. Nos. 5,911,940 and 6,124,370, which are incorporated herein by reference in their entirety. For example, it may be desirable to employ peroxide crosslinking agents in conjunction with silane crosslinking agents; peroxide crosslinking agents in conjunction with radiation; or sulfur-containing crosslinking agents in conjunction with silane crosslinking agents.

The functionalization may also occur at the terminal unsaturated group (e.g., vinyl group) or an internal unsaturation group, when such groups are present in the polymer. Such functionalization includes, but is not limited to, hydrogenation, halogenation (such as chlorination), ozonation, hydroxylation, sulfonation, carboxylation, epoxidation, and grafting reactions. Any functional groups, such as halogen, amine, amide, ester, carboxylic acid, ether, silane, siloxane, and so on, or functional unsaturated compounds, such as maleic anhydride, can be added across a terminal or internal unsaturation via known chemistry. Other functionalization methods include those disclosed in the following U.S. Pat. No. 5,849,828, entitled, "Metalation and Functionalization of Polymers and Copolymers;" U.S. Pat. No. 5,814,708, entitled, "Process for Oxidative Functionalization of Polymers Containing Alkylstyrene;" and U.S. Pat. No. 5,717,039, entitled, "Functionalization of Polymers Based on Koch Chemistry and Derivatives Thereof." Each of these patents is incorporated by reference, herein, in its entirety.

There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, N.Y., 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides. Some of the more preferable initiators, commonly used to modify the structure of polymers, are listed in U.S. Pat. No. 7,897,689, in the table spanning Col. 48 line 13-Col. 49 line 29, which is hereby incorporated by reference.

The amount of maleic anhydride used in the grafting reaction is less than, or equal to, 10 phr (parts per hundred, based on the weight of the olefin interpolymer), preferably less than 5 phr, and more preferably from 0.5 to 10 phr, and even more preferably from 0.5 to 5 phr.

The amount of initiator used in the grafting reaction is less than, or equal to, 10 millimoles radicals per 100 grams olefin interpolymer, preferably, less than, or equal to, 6 millimoles radicals per 100 grams olefin interpolymer, and more preferably, less than, or equal to, 3 millimoles radicals per 100 grams olefin interpolymer.

The amount of maleic anhydride constituent grafted onto the polyolefin chain is greater than 0.05 weight percent to 2.0 wt percent (based on the weight of the olefin interpolymer), as determined by titration analysis, FTIR analysis, or any other appropriate method. More preferably, this amount is greater than 0.25 weight percent to 2.0 weight percent, and in yet a further embodiment, this amount is greater than 0.3 weight percent to 2.0 weight percent. In a preferred embodiment, 0.5 weight percent to 2.0 weight percent of maleic anhydride is grafted.

The grafted resins have an MFR from 0.1 to 300 MFR (230° C. @ 2.16 kg), more preferred, 0.2 to 200, more preferred 0.5 to 100.

The CBCI of the grafted resins have a crystalline block composite index of at least about 0.10, preferably at least about 0.35, preferably at least about 0.57 and more preferably at least about 0.97.

The heat of fusion, or melt enthalpy, values of the grafted CBC are at least about 75 Joules per gram (J/g), more preferably at least about 80 J/g, still more preferably at least about 85 J/g and most preferably at least about 90 J/g, as measured by DSC. The heat of fusion values are also from 75 J/g to 250 J/g, preferably from 80 J/g to 200 J/g and also from 85 J/g to 150 J/g. All individual values and subranges from 75 J/g to 200 J/g are included herein and disclosed herein.

For silane grafting, the amount of silane used in the grafting reaction is greater than, or equal to, 0.05 phr (based on the amount of the olefin interpolymer), more preferably, from 0.5 phr to 6 phr, and even more preferably, from 0.5 phr to 4 phr. All individual values and subranges from 0.05 phr to 6 phr are included herein and disclosed herein.

In another embodiment, the amount of amount of initiator used in the silane grafting reaction is less than, or equal to, 4 millimoles radicals per 100 grams olefin interpolymer, preferably, from 0.01 millimoles to 2 millimoles radicals per 100 grams olefin interpolymer, and more preferably from 0.02 millimoles to 2 millimoles radicals per 100 grams olefin interpolymer. All individual values and subranges from 0.01 millimoles to 4 millimoles radicals per 100 grams olefin interpolymer are included herein and disclosed herein.

In another embodiment, the amount of silane constituent grafted on the polyolefin chain is greater than, or equal to, 0.05 weight percent (based on the weight of the olefin interpolymer), as determined by FTIR analysis, Si elemental analysis using neutron activation analysis, or other appropriate method. In a further embodiment, this amount is greater than, or equal to, 0.5 weight percent, and in yet a further embodiment, this amount is greater than, or equal to, 1.2 weight percent. In a preferred embodiment, the amount silane constituent grafted on the olefin interpolymer is from 0.5 weight percent to 4.0 weight percent. All individual values and subranges from 0.05 weight percent to 4.0 weight percent are considered within the scope of this invention, and are disclosed herein.

Suitable silanes include, but are not limited to, those of the general formula (I):

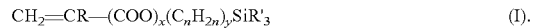

$$CH_2=CR-(COO)_x(C_nH_{2n})_y SiR'_3 \qquad (I).$$

In this formula, R is a hydrogen atom or methyl group; x and y are 0 or 1, with the proviso that when x is 1, y is 1; n is an integer from 1 to 12 inclusive, preferably 1 to 4, and each R' independently is an organic group, including, but not limited to, an alkoxy group having from 1 to 12 carbon atoms (e.g. methoxy, ethoxy, butoxy), an aryloxy group (e.g. phenoxy), an araloxy group (e.g. benzyloxy), an aliphatic or aromatic siloxy group, an aromatic acyloxyl group, an aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms.

In one embodiment, the silane compound is selected from vinyltrialkoxysilanes, vinyltriacyloxysilanes or vinyltrichlorosilane. In addition, any silane, or mixtures of silanes, which will effectively graft to, and/or crosslink, the olefin interpolymers can be used in the practice of this invention. Suitable silanes include unsaturated silanes that comprise both an ethylenically unsaturated hydrocarbyl group, such as a vinyl, allyl, isopropenyl, butenyl, cyclohexenyl or γ-(meth) acryloxy allyl group, and a hydrolyzable group, such as, a hydrocarbyloxy, hydrocarbonyloxy, or hydrocarbylamino group, or a halide. Examples of hydrolyzable groups include methoxy, ethoxy, formyloxy, acetoxy, proprionyloxy, chloro, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al., which is incorporated herein, in its entirety, by reference. Preferred silanes include vinyltrimethoxysilane, vinyltriethoxysilane, 3-(trimethoxysilyl)propyl methacrylate (γ-(meth)acryloxypropyl trimethoxysilane), and mixtures thereof.

In certain embodiments of the claimed invention, dual crosslinking systems, which use a combination of radiation, heat, moisture and crosslinking steps, may be effectively employed. For instance, it may be desirable to employ peroxide crosslinking agents in conjunction with silane crosslinking agents, peroxide crosslinking agents in conjunction with radiation, or sulfur-containing crosslinking agents in conjunction with silane crosslinking agents. Dual crosslinking systems are disclosed, and claimed in, U.S. Pat. Nos. 5,911,940 and 6,124,370, the entire contents of both are herein incorporated by reference.

The block composites and crystalline block composites may also be modified by azide modification. Compounds having at least two sulfonyl azide groups capable of C—H insertion under reaction conditions are referred to herein as coupling agents. For the purpose of the invention, the poly(sulfonyl azide) is any compound having at least two sulfonyl azide groups reactive with a polyolefin under reaction conditions. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly(sulfonyl)azides include such compounds as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof.

Polyfunctional compounds capable of insertions into C—H bonds also include carbene-forming compounds such as salts of alkyl and aryl hydrazones and diazo compounds, and nitrene-forming compounds such as alkyl and aryl azides (R—N3), acyl azides (R—C(O)N3), azidoformates (R—O—C(O)—N3), sulfonyl azides (R—SO2-N3), phosphoryl azides ((RO)2-(PO)—N3), phosphinic azides (R2-P (O)—N3) and silyl azides (R3-S1-N3).

To modify rheology, also referred to herein as "to couple," an azide, peroxide or other crosslinking agent is used in a rheology modifying amount, that is an amount effective to increase the low-shear viscosity (at 0.1 rad/sec) of the polymer preferably at least about 5 percent as compared with the starting material polymer, but less than a crosslinking amount, that is an amount sufficient to result in at least about 10 weight percent gel as measured by ASTM D2765-procedure A.

The functionalized polymers may also contain additives such as, but not limited to, antioxidants, slip agents, UV absorbers or stabilizers, antiblock agents, inorganic or organic fillers, color pigments or dyes and processing agents.

Test Methods

MFR: Melt Flow Rate is measured in accordance with ASTM D1238, Condition 230° C./2.16 kg.

DSC: Differential Scanning Calorimetry is used to measure, among other things, the heats of fusion of the crystalline block and block composites and is performed on a TA Instruments Q1000 DSC equipped with an RCS cooling accessory and an auto sampler. A nitrogen purge gas flow of 50 ml/min is used. The sample is pressed into a thin film and melted in the press at about 190° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 190° C. and held isothermal for 3 minutes in order to remove any previous thermal history. The sample is then cooled to −90° C. at 10° C./min cooling rate and held at −90° C. for 3 minutes. The sample is then heated to 190° C. at 10° C./min heating rate. The cooling and second heating curves are recorded. For the heat of fusion measurements for the CBC and specified BC resins, as known and routinely performed by skilled practitioners in this area, the baseline for the calculation is was drawn from the flat initial section prior to the onset of melting (typically in the range of from about −10 to about 20° C. for these types of materials) and extends to the end of melting for the second heating curve.

MAH Grafting Level

The polymer pellets are dried in a vacuum oven at 150° C. for 1.5 hr. The pellets are molded into film using a Carver hydraulic press at 190° C. for 30 sec under 3000 lb pressure at ambient atmosphere. The films of 3 mil thickness are cooled by transferring the plates to the lower level platens set at ambient temperature. IR spectra are collected using Nicolet 6700 FTIR. FTIR spectra were used for determining the level of g-MAH in each sample using a method that has been calibrated against the tetrabutylammonium Hydroxide (TBAOH) titration. The wt % of g-MAH was determined from the ratio of the height of the peak at ca. 1790 cm corresponding to the carbonyl stretch of the anhydride, to the height of the 2751 $cm^{-1}$, as follows $$\text{wt \% } MAH = 0.0344 \times \frac{(\text{peak height @ ca. } 1790\,\text{cm}^{-1})}{(\text{peak height @ ca. } 2751\,\text{cm}^{-1})} +$$

$$0.1925 \times \frac{(\text{peak height @ ca. } 1790\,\text{cm}^{-1})}{(\text{peak height @ ca. } 2751\,\text{cm}^{-1})} + 0.0767$$

As for the TBAOH titration, 1-2 g of the dried resin was dissolved in 150 ml xylene by heating the sample to 100 deg. C. on a stirred hot plate. Upon dissolution, the sample was titrated, while hot, with 0.025N TBAOH in 1:1 toluene/methanol using 10 drops of Bromothymol blue as indicator. The endpoint is recorded when solution turns blue.

Silane Grafting Level Analysis

Duplicate samples were prepared by transferring approximately 3.0 grams of the pellets into pre-cleaned 2-dram polyethylene vials. Samples are vacuum stripped at 140° C. for 20 minutes in a vacuum oven to remove any residual, volatile, or surface silane. Duplicate Si standards are prepared from their NIST traceable standard solution into similar vials. The standards are diluted to a similar volume as the samples using pure water. A blank sample of the water is also prepared. The samples, standards and a blank are then analyzed for Si. Specifically, irradiation is done for 3 minutes at 250 kW reactor power. The waiting time is 9 minutes and the counting time was 270 seconds using an HPGe detector set. The Si concentrations are calculated in ppm using Canberra software and comparative technique. Typical uncertainty ranges from 2% to 5% relative and the detection limit is less than 100 ppm. The vinyltrimethoxysilane content is back calculated using stoichiometry, assuming that the grafting is done using vinyltrimethoxysilane only.

Gel Fraction Analysis

Gel fractions of crosslinked silane grafted samples are measured using a Soxhlet extractor and xylene as solvent. Crosslinked samples are extracted under reflux for a minimum of 19 hours. The extracted samples are dried in a vacuum oven at 90° C. for 3 hours. The samples are crosslinked at 85% relative humidity and 85° C. for 3 weeks on a 4 mil compression molded film. Triple specimens are tested and the average was reported.

Tensile Properties

For tensile property measurements, samples are compression molded into 70 mil thick plaque (5 inch×5 inch) with a Carver hydraulic press at 190° C. for 6 min at 6000 lb at ambient atmosphere. The plaques are then cooled to 50° C. at 15° C./min in the press under 30000 lb force. Stress-strain behavior in uniaxial tension is measured using ASTM D1708 microtensile specimens. Specimens are die-cut from the plaques in conformation of the dimensions specified in ASTM D1708. The gauge length of samples is 22 mm and samples are stretched with an Instron at 554% of (initial gauge length) min$^{-1}$ at 23° C. Tensile properties are reported from an average of 5 specimens.

Transmission Electron Microscopy

The compression molded plaques used for microtensile test are examined by TEM. The samples are trimmed so that sections could be collected near the core of thickness of the sample. The trimmed samples are cryopolished at −60° C. to prevent smearing using a diamond knife on a Leica UCT microtome prior to staining. The cryo-polished blocks are stained with the vapor phase of a 2% aqueous ruthenium tetraoxide solution for 3 hrs at ambient temperature. The staining solution is prepared by weighing 0.2 gm of ruthenium (III) chloride hydrate (RuCl3×H$_2$O) into a glass bottle with a screw lid and adding 10 ml of 5.25% aqueous sodium hypochlorite to the jar. The samples are attached to a glass slide using double sided tape. The slide is placed in the jar in order to suspend the blocks about 1 inch above the staining solution for 3 hr. Sections of approximately 100 nanometers in thickness are collected from the stained sample at ambient temperature using a diamond knife on a Leica EM UC6 microtome and placed on 600 mesh virgin TEM grids for observation. TEM images are collected using a JEOL JEM-1230 operated at 100 kV accelerating voltage and photographed using a Gatan-791 and 794 digital cameras.

$^{13}$C NMR Spectroscopy Method for $^{13}$C-Labeled Maleic Anhydride Grafted Polyolefin The sample was prepared by adding approximately 2.7 g of TCE-d$_2$ with 0.025M chromium acetylacetonate (relaxation agent) to 0.2 g sample in a 10 mm NMR tube, and then purging in a N$_2$ box for 2 h. The sample was dissolved and homogenized by heating the tube and its contents at 140-150° C.

For $^{13}$C NMR, the data were collected using a Bruker 400 MHz spectrometer equipped with a Bruker Dual DUL high-temperature CryoProbe. This method is described in, for example, Z. Zhou, R. Kuemmerle, J. C. Stevens, D. Redwine, Y. He, X. Qiu, R. Cong, J. Klosin, N. Montanez, G. Roof, Journal of Magnetic Resonance, 2009, 200, 328-333 and Z. Zhou, J. C. Stevens, J. Klosin, R. Kümmerle, X. Qiu, D. Redwine, R. Cong, A. Taha, J. Mason, B. Winniford, P. Chauvel and N. Montañez, Macromolecules, 2009, 42, 2291-2294.

The data were acquired using 320 transients per data file, a 7.3 sec pulse repetition delay (6 sec delay+1.3 sec acq. time), 90 degree flip angles, and a modified inverse gated decoupling with a sample temperature of 120° C. All measurements were made on non spinning samples in locked mode. Samples were homogenized immediately prior to insertion into the heated (125° C.) NMR Sample changer, and were allowed to thermally equilibrate in the probe for 7 minutes prior to data acquisition.

Gel Permeation Chromatography (GPC)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute. Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.,*

6, 621 (1968)): $M_{polypropylene}=0.645(M_{polystyrene})$. Polypropylene equivalent molecular weight calculations are performed using Viscotek TriSEC software Version 3.0.

Fast-Temperature Rising Elution Fractionation (F-TREF)

In F-TREF analysis, the composition to be analyzed is dissolved in ortho-dichlorobenzene and allowed to crystallize in a column containing an inert support (stainless steel shot) by slowly reducing the temperature to 30° C. (at a preferred rate of 0.4° C./min). The column is equipped with an infra-red detector. An F-TREF chromatogram curve is then generated by eluting the crystallized polymer sample from the column by slowly increasing the temperature of the eluting solvent (o-dichlorobenzene) from 30 to 140° C. (at a preferred rate of 1.5° C./min).

High Temperature Liquid Chromatography (HTLC)

HTLC is performed according to the methods disclosed in U.S. Pat. No. 8,076,147 and US Patent Application Publication No. 2011-152499, both of which are herein incorporated by reference. Samples are analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IR5 detector was provided by Polymer-Char, Valencia, Spain.

Columns: The D1 column was a high temperature Hypercarb graphite column (2.1×100 mm) purchased from Thermo Scientific. The D2 column was a PLRapid-H column purchased from Varian (10×100 mm).

Reagents: HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation: 0.01-0.15 g of polyolefin sample was placed in a 10-mL Waters autosampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the autosampler for injection. Please note that the actual volume of the solution was more than 7 mL due to the thermal expansion of the solvent.

HT-2DLC: The D1 flow rate was at 0.01 mL/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean Step:
1. 490 min: flow=0.01 min; // Maintain the constant flow rate of 0.01 mL/min from 0-490 min.
2. 491 min: flow=0.20 min; // Increase the flow rate to 0.20 mL/min.
3. 492 min: % B=100; // Increase the mobile phase composition to 100% TCB
4. 502 min: % B=100; // Wash the column using 2 mL of TCB Equilibrium Step:
5. 503 min: % B=0; // Change the mobile phase composition to 100% of 1-decanol or decane
6. 513 min: % B=0; // Equilibrate the column using 2 mL of weak eluent
7. 514 min: flow=0.2 mL/min; // Maintain the constant flow of 0.2 mL/min from 491-514 min
8. 515 min: flow=0.01 mL/min; // Lower the flow rate to 0.01 mL/min.

After step 8, the flow rate and mobile phase composition were the same as the initial conditions of the run gradient. The D2 flow rate was at 2.51 mL/min. Two 60 µL loops were installed on the 10-port switch valve. 30-µL of the eluent from D1 column was loaded onto the SEC column with every switch of the valve.

The IR, LS15 (light scattering signal at 15°), LS90 (light scattering signal at 90°), and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

The weight % of isolated PP is measured as the area that corresponds to the hard block composition based on the isolated peak and the retention volume as determined by a composition calibration curve.

Xylene Soluble Fractionation Analysis

A weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed.

If the solution crystallization temperature of the soft block polymer is above room temperature, the fractionation step can be carried out at a temperature 10-20° C. above the soft blocks crystallization temperature but below the hard blocks crystallization temperature. The temperature of separation can be determined by TREF or CRYSTAF measurement as described by reference, TREF and CRYSTAF technologies for Polymer Characterization, Encyclopedia of Analytical Chemistry. 2000 Issue, Pages 8074-8094. This fractionation can be carried out in a laboratory heated dissolution and filtration apparatus or a fractionation instrument such as the Preparatory mc$^2$ (available from Polymer Char, Valencia, Spain).

Estimating the Block Composite Index

For a block composite derived from ethylene and propylene, the insoluble fractions will contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \% } C_{2_{Overall}} = w_{Insoluble}(\text{wt \% } C_{2_{Insoluble}}) + w_{soluble}(\text{wt \% } C_{2_{soluble}}) \quad \text{Eq. 1}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$\text{Wt \% } C_{2_{overall\ or\ xylene\ insoluble}} = \quad \text{Eq. 2}$$
$$w_{iPPHard}(\text{wt \% } C_{2_{iPP}}) + w_{EPsoft}(\text{wt \% } C_{2_{EPsoft}})$$

$$w_{iPPhard} = \frac{\text{wt \% } C_{2_{overall\ or\ xylene insoluble}} - \text{wt \% } C_{2_{EPsoft}}}{\text{wt \% } C_{2_{iPPhard}} - \text{wt \% } C_{2_{EPsoft}}} \quad \text{Eq. 3}$$

$$w_{EPsoft} = 1 - w_{iPPHard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

For example, if an iPP-EP block composite contains an overall ethylene content of 47 wt % $C_2$ and is made under conditions to produce an EP soft polymer with 67 wt % $C_2$ and an iPP homopolymer containing zero ethylene, the amount of EP soft and iPP hard is 70 wt % and 30 wt %, respectively (as calculated using Equations 3 and 4). If the percent of EP is 70 wt % and the iPP is 30 wt %, the relative ratio of the EP:iPP blocks could be expressed as 2.33:1.

Hence, if one skilled in the art carries out a xylene extraction of the polymer and recovers 40 wt % insoluble and 60 wt % soluble, this would be an unexpected result and this would lead to the conclusion that a fraction of block copolymer was present. If the ethylene content of the insoluble fraction is subsequently measured to be 25 wt % $C_2$, Equations 2 thru 4 can be solved to account for this additional ethylene and result in 37.3 wt % EP soft polymer and 62.7 wt % iPP hard polymer present in the insoluble fraction.

Since the insoluble fraction contains 37.3 wt % EP copolymer, it should be attached to an additional 16 wt % of iPP polymer based on the EP:iPP block ratio of 2.33:1. This brings the estimated amount of diblock in the insoluble fraction to be 53.3 wt %. For the entire polymer (unfractionated), the composition is described as 21.3 wt % iPP-EP Diblock, 18.7 wt % iPP polymer, and 60 wt % EP polymer. The term block composite index (BCI) is herein defined to equal the weight percentage of diblock divided by 100% (i.e. weight fraction). The value of the block composite index can range from 0 to 1, wherein 1 would be equal to 100% diblock and zero would be for a material such as a traditional blend or random copolymer. For the example described above, the block composite index for the block composite is 0.213. For the insoluble fraction, the BCI is 0.533, and for the soluble fraction the BCI is assigned a value of zero.

Depending on the estimations made of the total polymer composition and the error in the analytical measurements which are used to estimate the composition of the hard and soft blocks, between 5 to 10% relative error is possible in the computed value of the block composite index. Such estimations include the wt % C2 in the iPP hard block as measured from the DSC melting point, NMR analysis, or process conditions; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EP polymer chain must be connected to an iPP polymer block (or else it would have been extracted into the xylene soluble fraction).

Estimating the Crystalline Block Composite Index (CBCI)

Cyrstalline block composites having CAOP and CAOB composed of crystalline polypropylene and a CEP and CEB composed of crystalline polyethylene cannot be fractionated by conventional means. Techniques based on solvent or temperature fractionation, for example, using xylene fractionation, solvent/non-solvent separation, temperature rising elution fractionation, or crystallization elution fractionation are not capable of resolving the block copolymer since the CEB and CAOB cocrystallize with the CEP and CAOP, respectively. However, using a method such as high temperature liquid chromatography which separates polymer chains using a combination of a mixed solvent/non-solvent and a graphitic column, crystalline polymer species such as polypropylene and polyethylene can be separated from each other and from the block copolymer.

For crystalline block composites, the amount of isolated PP is less than if the polymer was a simple blend of iPP homopolymer (in this example the CAOP) and polyethylene (in this case the CEP). Consequently, the polyethylene fraction contains an appreciable amount of propylene that would not otherwise be present if the polymer was simply a blend of iPP and polyethylene. To account for this "extra propylene", a mass balance calculation can be performed to estimate a crystalline block composite index from the amount of the polypropylene and polyethylene fractions and the weight % propylene present in each of the fractions that are separated by HTLC. The polymers contained within the crystalline block composite include iPP-PE diblock, unbound iPP, and unbound PE where the individual PP or PE components can contain a minor amount of ethylene or propylene respectively.

Composition of the Crystalline Block Composite

A summation of the weight % propylene from each component in the polymer according to equation 1 results in the overall weight % propylene (of the whole polymer). This mass balance equation can be used to quantify the amount of the iPP and PE present in the diblock copolymer. This mass balance equation can also be used to quantify the amount of iPP and PE in a binary blend or extended to a ternary, or n-component blend. For the crystalline block composite, the overall amount of iPP or PE is contained within the blocks present in the diblock and the unbound iPP and PE polymers.

$$\text{Wt \% C3}_{Overall} = w_{PP}(\text{wt \% C3}_{PP}) + w_{PE}(\text{wt \% C3}_{PE}) \qquad \text{Eq. 1}$$

where
$w_{PP}$=weight fraction of PP in the polymer
$w_{PE}$=weight fraction of PE in the polymer
wt % $C3_{PP}$=weight percent of propylene in PP component or block
wt % $C3_{PE}$=weight percent of propylene in PE component or block.

Note that the overall weight % of propylene (C3) is preferably measured from C13 NMR or some other composition measurement that represents the total amount of C3 present in the whole polymer. The weight % propylene in the iPP block (wt % $C3_{PP}$) is set to 100 or if otherwise known from its DSC melting point, NMR measurement, or other composition estimate, that value can be put into its place. Similarly, the weight % propylene in the PE block (wt % $C3_{PE}$) is set to 100 or if otherwise known from its DSC melting point, NMR measurement, or other composition estimate, that value can be put into its place.

Calculating the Ratio of PP to PE in the Crystalline Block Composite

Based on equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{\text{wt \% C3}_{Overall} - \text{wt \% C3}_{PE}}{\text{wt \% C3}_{PP} - \text{wt \% C3}_{PE}} \qquad \text{Eq. 2}$$

where
$w_{PP}$=weight fraction of PP present in the whole polymer
wt % $C3_{PP}$=weight percent of propylene in PP component or block
wt % $C3_{PE}$=weight percent of propylene in PE component or block Estimating the Amount of the Diblock in the Crystalline Block Composite Applying equations 3 through 5, the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight % C3 of the whole polymer in the left hand side of equation 3, and the weight fraction of PP (isolated from HTLC) and the weight fraction of PE (separated by HTLC) into the right hand side of equation 3, the weight % of C3 in the PE fraction can be calculated using equations 4 and 5. The PE fraction is described as the fraction separated from the unbound PP and contains the diblock and unbound PE. The composition of the isolated PP is assumed to be the same as the weight % propylene in the iPP block as described previously.

$$\text{wt \% C3}_{Overall} = \qquad \text{Eq. 3}$$
$$w_{PPisolated}(\text{wt \% C3}_{PP}) + w_{PE\text{-}fraction}(\text{wt \% C3}_{PE\text{-}fraction})$$

$$\text{wt \% C3}_{PE\text{-}fraction} = \qquad \text{Eq. 4}$$
$$\frac{\text{wt \% C3}_{Overall} - w_{PPisolated}(\text{wt \% C3}_{PP})}{w_{PE\text{-}fraction}}$$

$$w_{PE\text{-}fraction} = 1 - w_{PPisolated} \qquad \text{Eq. 5}$$

where
$w_{PPisolated}$=weight fraction of isolated PP from HTLC
$w_{PE\text{-}fraction}$=weight fraction of PE separated from HTLC, containing the diblock and unbound PE
wt % $C3_{PP}$=weight % of propylene in the PP; which is also the same amount of propylene present in the PP block and in the unbound PP
wt % $C3_{PE\text{-}fraction}$=weight % of propylene in the PE-fraction that was separated by HTLC
wt % $C3_{Overall}$=overall weight % propylene in the whole polymer The amount of wt % C3 in the polyethylene fraction from HTLC represents the amount of propylene present in the block copolymer fraction that is above the amount present in the 'unbound polyethylene'.

To account for the 'additional' propylene present in the polyethylene fraction, the only way to have PP present in this fraction, is that the PP polymer chain must be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP\text{-}diblock} = \frac{\text{wt }\% \text{ } C3_{PE\text{-}fraction} - \text{wt }\% \text{ } C3_{PE}}{\text{wt }\% \text{ } C3_{PP} - \text{wt }\% \text{ } C3_{PE}} \quad \text{Eq. 6}$$

Where wt % $C^3_{PE\text{-}fraction}$=weight % of propylene in the PE-fraction that was separated by HTLC (Equation 4)

wt % $C3_{PP}$=weight % of propylene in the PP component or block (defined previously)

wt % $C3_{PE}$=weight % of propylene in the PE component or block (defined previously)

$w_{PP\text{-}diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP\text{-}diblock}$) multiplied by two. Another way to calculate this is by dividing the weight fraction of PP in the diblock ($w_{PP\text{-}diblock}$) by the weight fraction of PP in the whole polymer (equation 2).

To further estimate the amount of diblock present in the whole polymer, the estimated amount of diblock in the PE fraction is multiplied by the weight fraction of the PE fraction measured from HTLC.

To estimate the crystalline block composite index, the amount of block copolymer is determined by equation 7. To estimate the CBCI, the weight fraction of diblock in the PE fraction calculated using equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP\text{-}diblock}}{w_{PP}} \cdot w_{PE\text{-}fraction} \quad \text{Eq. 7}$$

Where $w_{PP\text{-}diblock}$=weight fraction of PP in the diblock separated with the PE-fraction by HTLC (Equation 6)

$w_{PP}$=weight fraction of PP in the polymer $w_{PE\text{-}fraction}$=weight fraction of PE separated from HTLC, containing the diblock and unbound PE (Equation 5)

For example, if an iPP-PE polymer contains a total of 62.5 wt % C3 and is made under the conditions to produce an PE polymer with 10 wt % C3 and an iPP polymer containing 97.5 wt % C3, the weight fractions of PE and PP are 0.400 and 0.600, respectively (as calculated using Equation 2). Since the percent of PE is 40.0 wt % and the iPP is 60.0 wt %, the relative ratio of the PE:PP blocks is expressed as 1:1.5.

Hence, if one skilled in the art, carries out an HTLC separation of the polymer and isolates 28 wt % PP and 72 wt % of the PE fraction, this would be an unexpected result and this would lead to the conclusion that a fraction of block copolymer was present. If the C3 content of the PE fraction (wt % $C_{3PE\text{-}fraction}$) is subsequently calculated to be 48.9 wt % C3 from equations 4 and 5, the PE fraction containing the additional propylene has 0.556 wt fraction of PE polymer and 0.444 weight fraction of PP polymer ($w_{PP\text{-}diblock}$, calculated using Equation 6).

Since the PE fraction contains 0.444 weight fraction of PP, it should be attached to an additional 0.293 weight fraction of PE polymer based on the iPP:PE block ratio of 1.5:1. Thus, the weight fraction of diblock present in the PE fraction is 0.741; further calculation of the weight fraction of diblock present in the whole polymer is 0.533. For the entire polymer, the composition is described as 53.3 wt % iPP-PE diblock, 28 wt % PP polymer, and 18.7 wt % PE polymer. The crystalline block composite index (CBCI) is the estimated weight fraction of diblock present in the whole polymer. For the example described above, the CBCI for the crystalline block composite is 0.533.

The Crystalline Block Composite Index (CBCI) provides an estimate of the quantity of block copolymer within the crystalline block composite under the assumption that the ratio of CEB to CAOB within the diblock is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification.

The calculation of CBCI is based on the analytical observation that the amount of free CAOP is lower than the total amount of CAOP that was produced in the polymerization. The remainder of the CAOP is bound to CEB to form the diblock copolymer. Because the PE fraction separated by HTLC contains both the CEP and the diblock polymer, the observed amount of propylene for this fraction is above that of the CEP. This difference can be used to calculate the CBCI.

Based solely on the analytical observations without prior knowledge of the polymerization statistics, the minimum and maximum quantities of block copolymer present in a polymer can be calculated, thus distinguishing a crystalline block composite from a simple copolymer or copolymer blend.

The upper bound on the amount of block copolymer present within a crystalline block composite, $w_{DB_{Max}}$, is obtained by subtracting the fraction of unbound PP measured by HTLC from one as in Equation 8. This maximum assumes that the PE fraction from HTLC is entirely diblock and that all crystalline ethylene is bound to crystalline PP with no unbound PE. The only material in the CBC that is not diblock is that portion of PP separated via HTLC.

$$w_{DB_{Max}} = 1 - w_{PP_{isolated}} \quad \text{Eq. 8}$$

The lower bound on the amount of block copolymer present within a crystalline block composite, $w_{DB_{Min}}$, corresponds to the situation where little to no PE is bound to PP. This lower limit is obtained by subtracting the amount of unbound PP as measured by HTLC from the total amount of PP in the sample as shown in Equation 9.

$$w_{DB_{Min}} = w_{PP} - w_{PP_{isolated}} \quad \text{Eq. 9}$$

Furthermore, the crystalline block composite index will fall between these two values:

$$w_{DB_{Min}} < CBCI \leq w_{DB_{Max}}.$$

Based on the polymerization mechanism for production of the crystalline block composites, the CBCI represents the best estimate of the actual fraction of diblock copolymer in the composite. For unknown polymer samples, $w_{DB_{Min}}$ can be used to determine if a material is a crystalline block composite. Consider the application of this analysis to homopolymers, copolymers or blends. For a physical blend of PE and PP, the overall weight fraction of PP should be equal to that of the wt % PP from HTLC and the lower bound on diblock content, Equation 9, is zero. If this analysis is applied to a sample of PP that does not contain PE both the weight fraction of PP and amount of PP obtained from HTLC are 100% and again the lower bound on diblock content, Equation 9, is zero. Finally if this analysis is applied to a sample of PE that does not contain PP then both the weight fraction of PP and weight fraction PP recovered via HTLC are zero and the lower bound on diblock, Equation 9, is zero. Because the lower bound on diblock content is not greater than zero in any of these three cases, these materials are not crystalline block composites.

EXAMPLES

TABLE 1

Description of materials

| Material | Description |
|---|---|
| CBC1 | 50/50 EP/iPP, 90 wt % C2 in EP, 30 MFR |
| CBC2 | 50/50 EP/iPP, 90 wt % C2 in EP, 3.6 MFR |
| CBC3 | 30/70 EP/iPP, 90 wt % C2 in EP, 20 MFR |
| CBC4 | 30/70 EP/iPP, 90 wt % C2 in EP, 3 MFR |
| CBC5 | 50/50 EP/iPP, 90 wt % C2 in EP, 7.5 MFR |
| CBC6 | 30/70 EP/iPP, 90 wt % C2 in EP, 4.9 MFR |
| OBC1 | INFUSE ™ 9807; ethylene octene block copolymer, Density = 0.866 g/cc, MI = 15 g/10 min (@190° C.) (The Dow Chemical Company) |
| OBC2 | INFUSE ™ 9500; ethylene octene block copolymer, Density = 0.877 g/cc, MI = 5 g/10 min (@190° C.) (The Dow Chemical Company) |
| EP1 | EP single reactor product, 90 wt % C2, 6.3 MFR |
| iPP1 | iPP single reactor product, 7.7 MFR |
| BC1 | 50/50 EP/iPP, 65 wt % C2 in EP, 4.1 MFR |
| BC2 | 50/50 EP/iPP, 40 wt % C2 in EP, 6.0 MFR |
| POX | 2,5-Dimethyl-2,5-di(t-butylperoxy) hexane, CAS# 78-63-7, LUPEROX 101 dialkyl peroxide, supplied by Aldrich |
| MAH | Maleic anhydride CAS# 108-31-6, 98+% from Alfa Aesar |
| MEK | Methyl ethyl ketone (CAS# 78-93-3, 2-Butanone from Sigma-Aldrich) |

TABLE 1-continued

Description of materials

| Material | Description |
|---|---|
| VTMOS | Vinyltrimethoxysilane (VTMOS), CAS# 2768-02-7, XIAMETER OFS-6300 Silane from Dow Corning |
| DEDA | 2-ethylaminoethylamine (CAS# 110-72-5, from Sigma-Aldrich) |
| $^{13}$C-MAH | Maleic anhydride(2,3-13C2), CAS# 41403-35-4, supplied by Cambridge Isotope Laboratories, Inc. |

Synthesis of Crystalline Block Composites

General

Catalyst-1 ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-κ O]](2-)]dimethyl-hafnium) and cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane (MMAO)) were purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

The crystalline block composites of the present Examples are designated CBC1-CBC6. They are prepared using two continuous stirred tank reactors (CSTR) connected in series. The first reactor was approximately 12 gallons in volume while the second reactor was approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 2. The first reactor contents as described in Table 2 flow to a second reactor in series. Additional monomers, solvent, hydrogen, catalyst-1, cocatalyst-1, and optionally, cocatalyst-2, are added to the second reactor. Table 3 shows the analytical characteristics of CBC1-CBC6.

TABLE 2

Reactor process conditions to produce crystalline block composites CBC1-CBC6

| | Material | | | | | |
|---|---|---|---|---|---|---|
| | CBC1 | | CBC2 | | CBC3 | |
| Reactor | 1st Reactor | 2nd Reactor | 1st Reactor | 2nd Reactor | 1st Reactor | 2nd Reactor |
| Reactor Control Temp. (° C.) | 130 | 115 | 118 | 110 | 120 | 115 |
| Solvent Feed (lb/hr) | 228 | 185 | 145 | 145 | 130 | 292 |
| Propylene Feed (lb/hr) | 4.34 | 34.88 | 1.98 | 31.03 | 2.92 | 58.66 |
| Ethylene Feed (lb/hr) | 32.9 | 0.0 | 27.8 | 0.0 | 24.5 | 0.0 |
| Hydrogen Feed (SCCM) | 9.7 | 9.3 | 9.6 | 9.2 | 9.7 | 9.8 |
| Reactor Propylene Conc. (g/L) | 1.64 | 2.27 | 1.06 | 2.00 | 1.98 | 1.93 |
| Catalyst Efficiency (gPoly/gM) *1.0E6 | 0.877 | 0.238 | 5.166 | 0.167 | 0.738 | 0.081 |
| Catalyst Flow (lb/hr) | 0.68 | 0.38 | 1.16 | 0.95 | 0.89 | 1.79 |
| Catalyst Conc. (ppm) | 60 | 385 | 5 | 196 | 40 | 400 |

TABLE 2-continued

Reactor process conditions to produce crystalline block composites CBC1-CBC6

| | | | | | | |
|---|---|---|---|---|---|---|
| Cocatalyst-1 Flow (lb/hr) | 0.91 | 0.20 | 1.48 | 0.93 | 0.80 | 0.96 |
| Cocatalyst-1 Conc. (ppm) | 600 | 6000 | 50 | 2000 | 600 | 6000 |
| Cocat.-2 Flow (lb/hr) | 0.57 | 0.00 | 0.91 | 0.00 | 0.51 | 0.00 |
| Cocat.-2 Conc. (ppm) | 3995 | 0 | 1494 | 0 | 3995 | 0 |
| DEZ Flow (lb/hr) | 1.24 | 0.00 | 1.10 | 0.00 | 1.65 | 0.00 |
| DEZ Conc. (ppm) | 50000 | 0 | 30000 | 0 | 30000 | 0 |
| Production Rate (lb/hr) | 35.6 | 35.0 | 29.2 | 31.1 | 26.3 | 58.4 |

| | Material | | | | | |
|---|---|---|---|---|---|---|
| | CBC4 | | CBC5 | | CBC6 | |
| Reactor | 1st Reactor | 2nd Reactor | 1st Reactor | 2nd Reactor | 1st Reactor | 2nd Reactor |
| Reactor Control Temp. (° C.) | 96 | 116 | 141 | 135 | 140 | 115 |
| Solvent Feed (lb/hr) | 167 | 253 | 242 | 245 | 144 | 360 |
| Propylene Feed (lb/hr) | 3.48 | 50.99 | 5.44 | 48.76 | 3.42 | 69.17 |
| Ethylene Feed (lb/hr) | 28.2 | 0.0 | 47.0 | 0.0 | 28.0 | 0.0 |
| Hydrogen Feed (SCCM) | 9.7 | 9.6 | 9.5 | 0.0 | 9.6 | 9.6 |
| Reactor Propylene Conc. (g/L) | 2.20 | 2.67 | 3.57 | 2.26 | 1.99 | 2.03 |
| Catalyst Efficiency (gPoly/gM) *1.0E6 | 2.434 | 0.028 | 0.706 | 0.075 | 0.581 | 0.146 |
| Catalyst Flow (lb/hr) | 0.42 | 3.00 | 0.47 | 1.78 | 0.36 | 0.93 |
| Catalyst Conc. (ppm) | 30 | 600 | 150 | 500 | 150 | 500 |
| Cocatalyst-1 Flow (lb/hr) | 0.57 | 2.08 | 1.41 | 1.12 | 0.36 | 0.58 |
| Cocatalyst-1 Conc. (ppm) | 300 | 7800 | 500 | 8000 | 2000 | 8000 |
| Cocat.-2 Flow (lb/hr) | 0.60 | 0.00 | 1.18 | 9.98 | 0.75 | 15.02 |
| Cocat.-2 Conc. (ppm) | 1993 | 0 | 1993 | 1993 | 1993 | 1797 |
| DEZ Flow (lb/hr) | 0.97 | 0.00 | 1.89 | 0.00 | 1.20 | 0.00 |
| DEZ Conc. (ppm) | 30000 | 0 | 30000 | 0 | 30000 | 0 |
| Production Rate (lb/hr) | 30.9 | 50.4 | 49.5 | 56.1 | 31.0 | 68.1 |

TABLE 3

Crystalline block composite physical properties

| Example | MFR (230° C./ 2.16 kg) | Wt % PP from HTLC Separation | Mw Kg/mol | Mw/ Mn | Total Wt % $C_2$ | Tm (° C.) Peak 1 (Peak 2) | Tc (° C.) | Melt Enthalpy (J/g) |
|---|---|---|---|---|---|---|---|---|
| CBC1 | 30.9 | 16.3 | 69.7 | 3.18 | 47.5 | 120 (106) | 89 | 90 |
| CBC2 | 3.6 | 13.2 | 146 | 2.76 | 46.7 | 130 (114) | 97 | 126 |
| CBC3 | 23.5 | 27.1 | 127 | 4.26 | 28.8 | 136 (105) | 94 | 100 |
| CBC4 | 3.5 | 34.0 | 180 | 3.63 | 28.9 | 136 (101) | 97 | 97 |
| CBC5 | 7.5 | 19.4 | 109 | 2.83 | 48.3 | 129 (108) | 91 | 91 |
| CBC6 | 4.9 | 35.8 | 160 | 2.84 | 29.4 | 139 (104) | 102 | 89 |

Table 4 shows the ratio of iPP to EP as well as the estimated crystalline block composite index for CBC1-CBC6.

TABLE 4

Crystalline Block Composite Index Estimation

| Sample | wt % iPP | wt % EP | Wt % $C_2$ in EP | Crystalline Block Composite Index |
|--------|----------|---------|------------------|-----------------------------------|
| CBC1   | 48       | 52      | 90               | 0.634                             |
| CBC2   | 49       | 51      | 90               | 0.729                             |
| CBC3   | 69       | 31      | 90               | 0.605                             |
| CBC4   | 70       | 30      | 90               | 0.702                             |
| CBC5   | 50       | 50      | 90               | 0.583                             |
| CBC6   | 70       | 30      | 90               | 0.473                             |

FIG. 1 shows the DSC profile for CBC2. The DSC profile shows a melting peak at 129° C. which is representative of the CAOP and CAOB and 113° C. which corresponds to the CEP and CEB. The observed melt enthalpy was 115 J/g and glass transition temperature was observed at −11° C.

Figure 2:
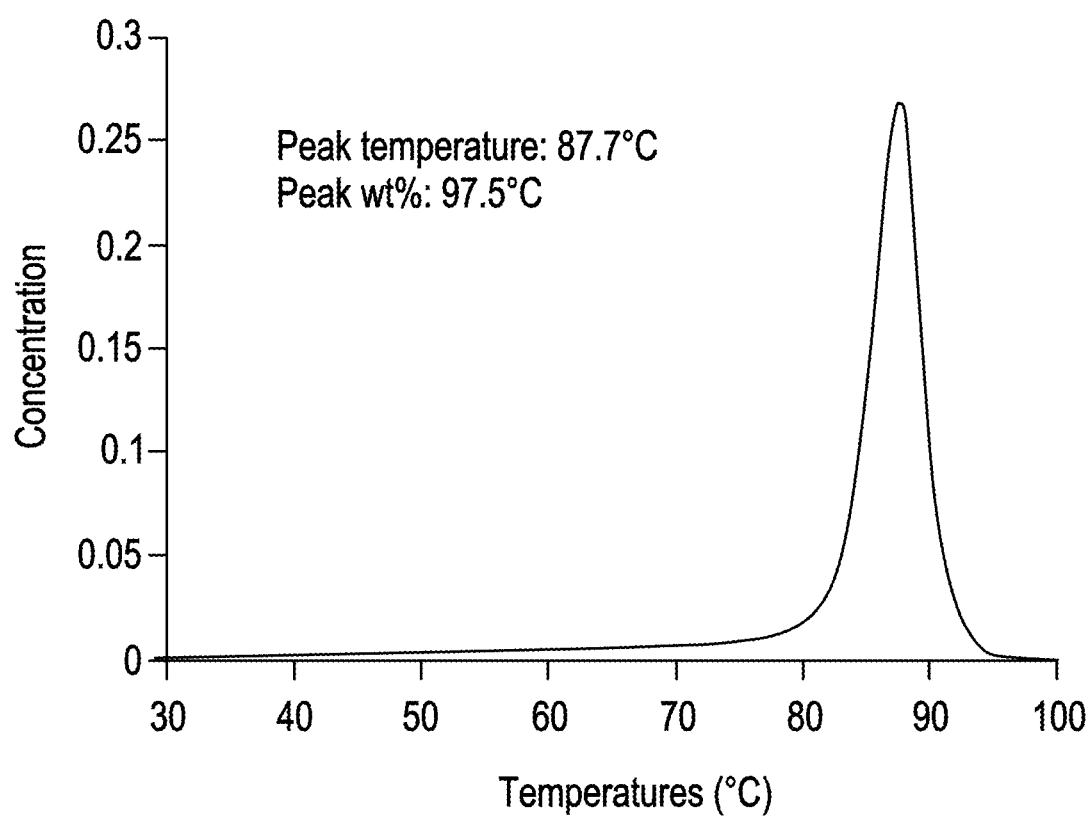
FIG. 2 shows the TREF analysis of CBC2.

FIG. 2 shows the TREF analysis of CBC2. The TREF elution profile shows that CBC2 is highly crystalline and in contrast to the DSC melting profile, shows little or no separation of the CEP and CAOP or the block copolymer. Only 2.4 wt % purge was measured which also indicates the very high crystallinity of components in CBC2.

Figure 3:
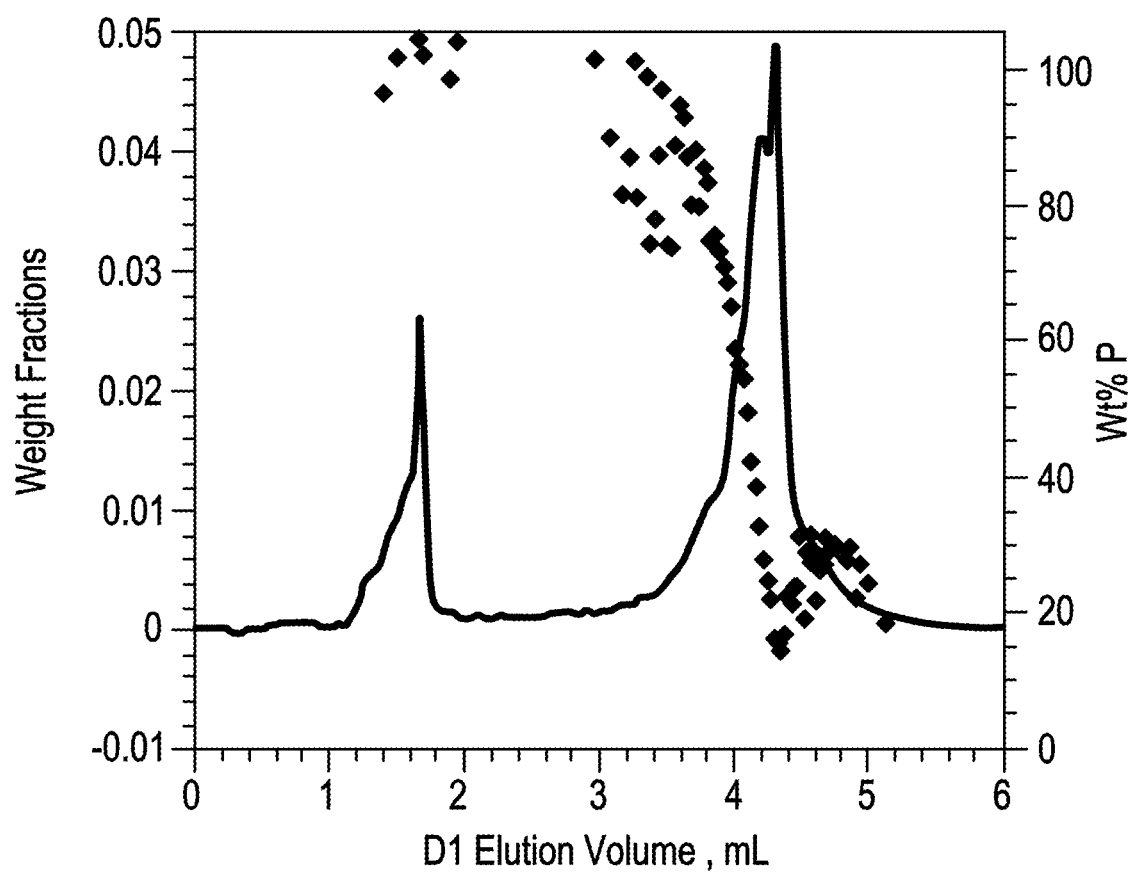
FIG. 3 shows HTLC analysis of CBC2.

FIG. 3 shows HTLC analysis of CBC2. The elution profile of CBC2 by HTLC showed that 13.2 wt % of an early eluting peak between 1-2 mL and 86.8 wt % of a later eluting peak between 3-5 mL was eluted. From the concentration and composition measurement, it is determined that the early eluting peak was isolated PP which is CAOP and representative of the CAOB. This is shown by the composition profile of the wt % of C3 present. The second peak and later eluting peak is rich in C2 and shows a gradient of C3. It can be interpreted that this peak is the PE phase and contains the block copolymer and CEP. The composition gradient shows that the block copolymer is eluted earlier and the CEP is eluted last.

Synthesis of Block Composites

The Block Composite samples are synthesized in dual reactors in series in a similar fashion to the Crystaline Block Composite samples. The first reactor in each case was approximately 12 gallons in volume while the second reactor was approximately 26 gallons. The process conditions are contained in Table 5.

TABLE 5

Reactor process conditions to produce block composites

| Material | BC1 | | BC2 | |
|---|---|---|---|---|
| Reactor | 1st reactor | 2nd reactor | 1st reactor | 2nd reactor |
| Reactor Control Temp. (° C.) | 95 | 105 | 96 | 109 |
| Solvent Feed (lb/hr) | 145 | 145 | 145 | 145 |
| Propylene Feed (lb/hr) | 11 | 30 | 19 | 29 |
| Ethylene Feed (lb/hr) | 20 | 0 | 12 | 0 |
| Reactor Propylene Conc. (g/L) | 1.72 | 2.08 | 2.14 | 2.08 |
| Hydrogen Feed (SCCM) | 15 | 19 | 10 | 11 |
| Catalyst Efficiency (gPoly/gM) * 106 | 4.55 | 0.20 | 5.42 | 0.15 |
| Catalyst Flow (lb/hr) | 0.15 | 0.74 | 0.38 | 1.02 |
| Catalyst Conc. (ppm) | 45 | 196 | 15 | 196 |
| Cocatalyst-1 Flow (lb/hr) | 0.3 | 0.73 | 0.38 | 1.99 |
| Cocatalyst-1 Conc. (ppm) | 300 | 2000 | 199 | 1000 |
| Cocat.-2 Flow (lb/hr) | 1.01 | 0 | 0.61 | 0 |
| Cocat.-2 Conc. (ppm) | 1494 | 0 | 1494 | 0 |
| DEZ Flow (lb/hr) | 0.81 | 0 | .72 | 0 |
| DEZ Concentration (ppm) | 30000 | 0 | 30000 | 0 |
| Production Rate (lb/hr) | 30 | 30 | 31 | 29 |

TABLE 6

Block composite physical properties

| Example | MFR (230° C./ 2.16 kg) | Wt % PP from HTLC Separation | Mw Kg/mol | Mw/Mn | Total Wt % $C_2$ | Tm (° C.) Peak 1 (Peak 2) | Tc (° C.) | Melt Enthalpy (J/g) |
|---|---|---|---|---|---|---|---|---|
| BC1 | 4.1 | 21.5 | 133 | 2.35 | 33.8 | 139 (40) | 93 | 66 |
| BC2 | 6.0 | 21.6 | 176 | 3.69 | 20.5 | 138 (na) | 96 | 56 |

TABLE 7

Block Composite Index Estimations

| Sample | Wt % iPP | Wt % EP | Wt % C2 in EP | (Crystalline) Block Composite Index |
|---|---|---|---|---|
| BC1 | 49 | 51 | 65 | 0.413 |
| BC2 | 50 | 50 | 40 | 0.368 |

Synthesis of EP1 and iPP1

Samples EP1 and iPP1 were produced using the same catalyst and cocatalysts as the Crystaline Block Composites and Block Composites but each were produced in a single reactor. For sample EP1 the final product MFR was regulated by manipulating the DEZ flow. Sample iPP1 was produced at higher propylene concentration in the reactor and hydrogen was used to regulate the final product MFR rather than DEZ. Sample EP1 was produced in a 12 gallon reactor and iPP1 was produced in a 52 gallon reactor.

TABLE 8

Reactor process conditions to produce EP1 and iPP1

| | Material | |
|---|---|---|
| | EP1 | iPP1 |
| Reactor Control Temp. (° C.) | 146 | 155 |
| Solvent Feed (lb/hr) | 290 | 1208.3 |
| Propylene Feed (lb/hr) | 7.4 | 322.2 |
| Ethylene Feed (lb/hr) | 57.8 | 2.5 |
| Hydrogen Feed (SCCM) | 0 | 171 |
| Reactor Propylene Conc. (g/L) | 4.13 | 46.56 |
| Catalyst Efficiency (gPoly/gM) * 106 | 1.12 | 0.794 |
| Catalyst Flow (lb/hr) | 0.85 | 2.45 |
| Catalyst Conc. (ppm) | 64.9 | 120 |
| Cocatalyst-1 Flow (lb/hr) | 0.55 | 1.55 |
| Cocatalyst-1 Conc. (ppm) | 1000 | 1397 |
| Cocat.-2 Flow (lb/hr) | 1.40 | 1.11 |
| Cocat.-2 Conc. (ppm) | 3995 | 1397 |
| DEZ Flow (lb Zn/hr) | 1.68 | 0 |
| DEZ Concentration (ppm) | 40,000 | 0 |
| Production Rate (lb/hr) | 63.4 | 233 |

TABLE 9

Single reactor product physical properties

| Example | MFR (230° C./ 2.16 kg) | Mw Kg/mol | Mw/Mn | Total Wt % $C_2$ | Tm (° C.) | Tc (° C.) | Melt Enthalpy (J/g) |
|---|---|---|---|---|---|---|---|
| EP1 | 6.2 | 70.6 | 2.06 | 92 | 108 | 92 | 115 |
| iPP1 | 7.7 | 248 | 2.64 | 0.9 | 131 | 99 | 75 |

Preparation of MAH Grafted OBC1 (MAH-g-OBC1)

A ZSK-92 Megacompounder with 11 barrels (45 L/D) is used to graft MAH on INFUSE™ 9807 (OBC1). The OBC1 resin is fed with K-Tron T-60 feeder. MAH is injected at barrel 3, port 1 using a Lewa pump. The peroxide/oil mixture (50/50 wt/wt) was injected at barrel 3, port 2 using a Prominent Sigma plunger pump. The barrel temperature is set at 80° C. for zone 1 and 225° C. for zone 2 to 11. A vacuum pump system is used for devolatilization at barrel 9. A minimum of 20 inches Hg is used. The screw RPM is at 200 to 230, the torque ranges from 56% to 61%. The feed rate for OBC1 is set at 1500 lb/hr. The feed formulation is 1.70% MAH, 0.20% peroxide/mineral oil (50/50, wt/wt) mixture. The final MAH grafting level is 0.95% and melt index of MAH-g-OBC1 is 8.0 (2.16 kg, 190° C.).

Preparation of MAH Grafted Polymers (MAH Grafted CBC, EP1, iPP1 and Blends of EP1 and iPP1)

A Coperion ZSK-25MC twin screw extruder is used for the reactive extrusion process to functionalize the base plastic resins. The 25-mm diameter extruder was equipped with 12 barrel segments for a total length to diameter ratio of 48. There are 11 independently controlled barrel sections with electric heating and water cooling. Polymer pellets are fed to the main extruder hopper in barrel 1 using a K-tron Model KCLQX3 loss-in-weight feeder. The liquid reactants were injected into the third barrel section of the extruder using a HPLC precision metering pump (Alltech Model 627 HPLC pump). A dialkyl organic peroxide (Luperox 101, CAS #78-63-7) is used as the initiator. The liquid feed to the extruder included a solvent blend containing both the maleic anhydride monomer and the organic peroxide. In order to improve the accuracy of the feeding, both the peroxide and maleic anhydride powder were dissolved in methylethylketone (MEK) solvent. 300 grams of maleic anhydride crystals were weighted out and placed into a 2-liter plastic container with a sealable lid. An equal weight of MEK solvent was weighted out on a scale, and added to the container with the maleic anhydride. The blend was left in the laboratory hood with a magnetic stir bar to assist in dissolving the maleic anhydride into the solvent. The ratio of maleic anhydride to peroxide was held constant for the experimental samples at 0.02 parts peroxide and 0.9 parts maleic anhydride. In order to minimize the time when the peroxide and monomer are mixed together, the peroxide were dissolved in the previously made MEK/maleic anhydride solution immediately before moving the blend to the inlet of the positive displacement pump. The HPLC injection rate was 9.07 g/min. Typical injection pressures for the liquids were 115-160 psi. The MEK solvent, unreacted maleic anhydride and volatile compounds were removed via the vacuum line-trap system at the devolatilization port in barrel 11. The vacuum system was operated at 508 mm Hg vacuum. The melt was pelletized using a GALA LPU underwater pelletization system. A two-hole die was used with 7.2° C. water temperature and a cutter speed of 1700 rpm. The polymer feed rate to the process was 6.80 kg/h with a fixed extruder screw speed of 500 rpm and a motor torque load of 55-65%.

The formulations used for grafting maleic anhydride (MAH) to CBC1-CBC4 are shown in Table 10. Process conditions for production of MAH grafted CBC2 are shown in Table 11. Similar conditions were used for CBCT and CBC3-CBC6.

Figure 4:
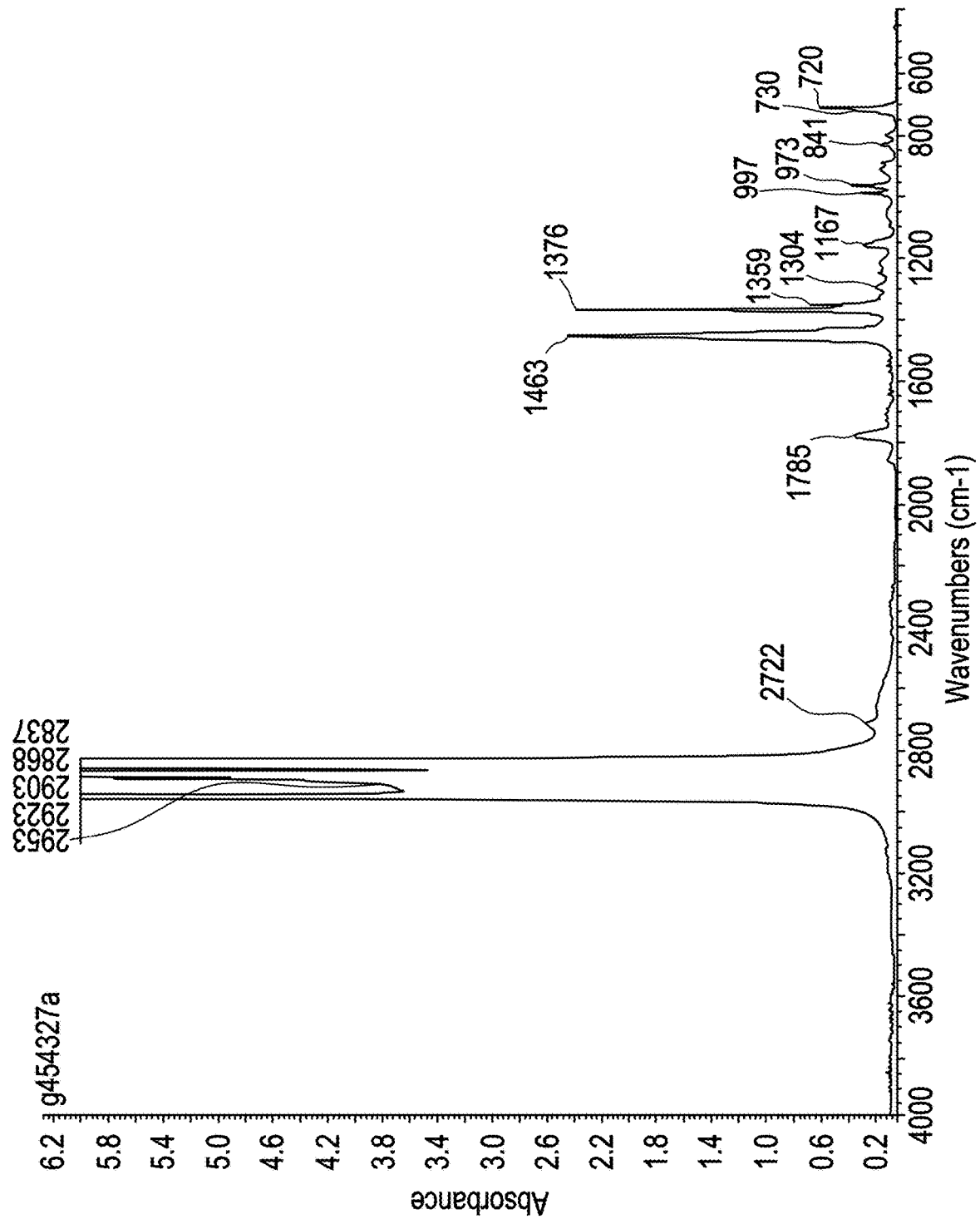
FIG. 4 shows the IR spectrum for MAH-g-CBC2-4.
Figure 5:
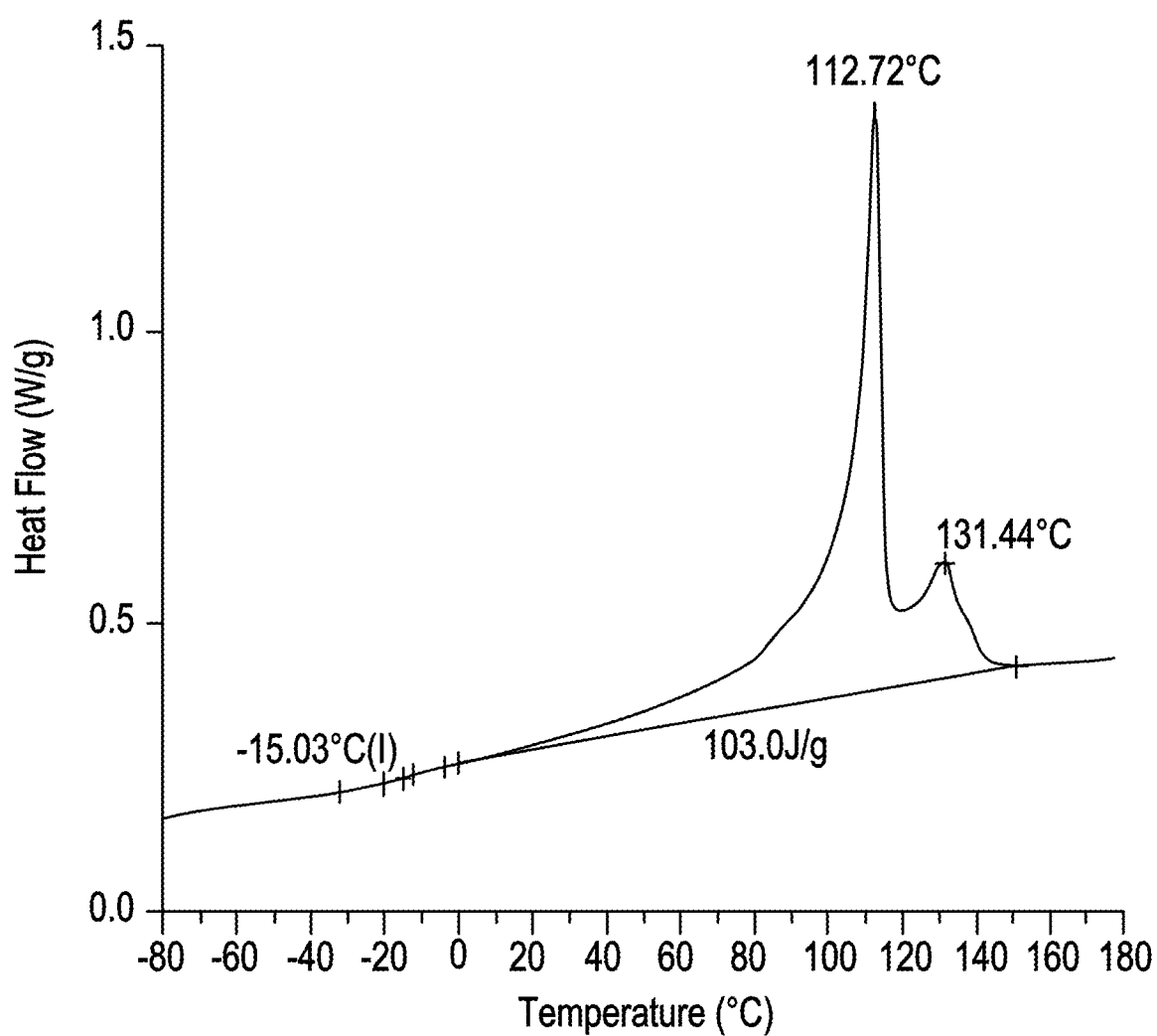
FIG. 5 shows the DSC profile for MAH-g-CBC2-4.
Figure 6:
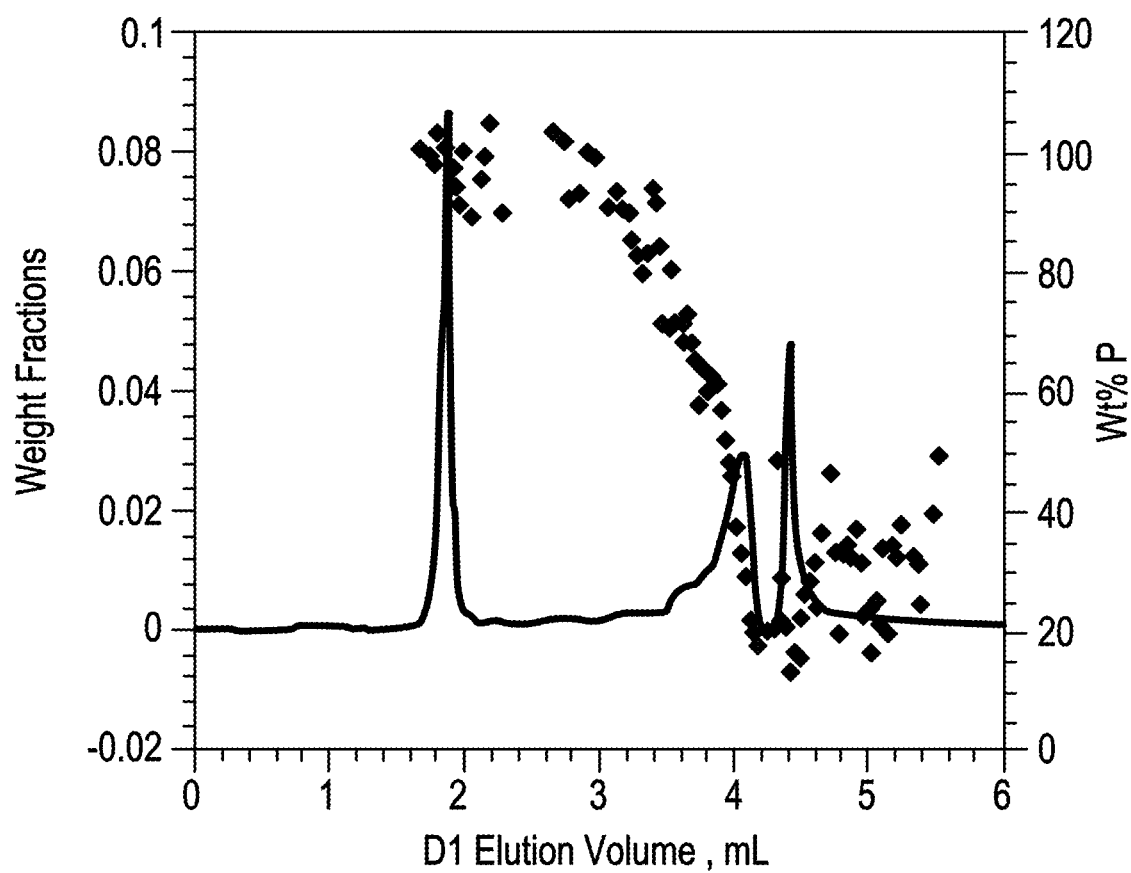
FIG. 6 shows HTLC analysis of MAH-g-CBC2-4.

An IR spectrum for MAH-g-CBC2-4 is shown in FIG. 4. The anhydride peak can be seen at 1785 $cm^{-1}$. A typical thermogram for MAH-g-CBC2-4 is shown in FIG. 5. The DSC profile shows a melting peak at 131° C. which is representative of the CAOP and CAOB and 113° C. which corresponds to the CEP and CEB. The observed melt enthalpy is 103 J/g. The thermal properties of the grafted CBC2 are comparable to the original CBC2 before grafting. A typical HTLC for MAH-g-CBC2-4 is shown in FIG. 6. The elution profile of CBC2 by HTLC shows that 29 wt % of an early eluting peak between 1.6-2.2 mL and 71 wt % of a later eluting peak between 3-5 mL is eluted. From the concentration and composition measurement, it is determined that the early eluting peak was isolated PP which is CAOP and representative of the CAOB. This is shown by the composition profile of the wt % of $C_3$ present. The second peak and later eluting peak is rich in $C_2$ and shows a gradient of $C_3$. It can be interpreted that this peak is the PE phase and contains the block copolymer and CEP. The composition gradient shows that the block copolymer is eluted earlier and the CEP is eluted last.

The characterizations of MAH-g-CBC and MAH-g-OBC1 are shown in Table 12. Compared to Example A, inventive Examples 1, 2 and 5-8 have higher melting temperatures. All inventive examples in Table 12 have higher melt enthalpy than Example A, which translates to a high crystallinity. The tensile properties of MAH-g-CBC and MAH-g-OBC1 are shown in Table 13. The inventive examples in Table 12 have higher tensile modulus, toughness and ultimate tensile strength.

TABLE 10

MAH grafting formulation and resin properties

| | | Feed (wt %) | | | |
|---|---|---|---|---|---|
| Example | Description | Polymer | MAH | POX | MEK |
| 1 | MAH-g-CBC2-2 | 96.36 | 1.80 | 0.04 | 1.80 |
| 2 | MAH-g-CBC2-4 | 92.72 | 3.60 | 0.08 | 3.60 |
| 3 | MAH-g-CBC1-1 | 92.72 | 3.60 | 0.08 | 3.60 |
| 4 | MAH-g-CBC1-2 | 92.68 | 3.60 | 0.12 | 3.60 |
| 5 | MAH-g-CBC3-1 | 92.68 | 3.60 | 0.12 | 3.60 |
| 6 | MAH-g-CBC3-2 | 92.60 | 3.60 | 0.20 | 3.60 |
| 7 | MAH-g-CBC4-1 | 92.68 | 3.60 | 0.12 | 3.60 |
| 8 | MAH-g-CBC4-2 | 92.60 | 3.60 | 0.20 | 3.60 |

TABLE 11

Process Conditions for Production of MAH grafted Polymer Samples

| | Sample No. | | | |
|---|---|---|---|---|
| | MAH-g-CBC2-2 | | MAH-g-CBC2-4 | |
| #1 Pellet Feed Rate [kg/h] | 6.80 | | 6.80 | |
| HPLC [g/min] | 4.29 | | 9.07 | |
| Screw RPM | 500 | | 500 | |
| | SP | Actual | SP | Actual |
| Zone #1 [° C.] | 120 | 112 | 120 | 112 |
| Zone #2 [° C.] | 200 | 200 | 200 | 200 |
| Zone #3 [° C.] | 200 | 200 | 200 | 200 |
| Zone #4 [° C.] | 200 | 200 | 200 | 200 |
| Zone #5 [° C.] | 200 | 200 | 200 | 200 |
| Zone #6 [° C.] | 200 | 198 | 200 | 200 |
| Zone #7 [° C.] | 200 | 200 | 200 | 200 |
| Zone #8 [° C.] | 200 | 200 | 200 | 200 |
| Zone #9 [° C.] | 200 | 200 | 200 | 200 |
| Zone #10 [° C.] | 200 | 200 | 200 | 200 |
| Zone #11 [° C.] | 200 | 200 | 200 | 200 |
| Divert Valve [C] | 200 | 200 | 200 | 200 |
| Gala Die [° C.] | 185 | 185 | 185 | 185 |
| Gala RPM | | 1700 | | 1700 |
| Gala water temp (° C.) | | 7.2 | | 7.2 |
| Torque % | | 56 | | 62 |
| Die pressure (MPa) | | 3.25 | | 3.31 |

TABLE 12

Characterizations of MAH-g-CBC

| Example | Description | MFR (2.16 kg, 230° C.) | Grafting level MAH wt % | Wt % PP From HTLC Separation | Tm (° C.) Peak 1 (Peak 2) | Tc (° C.) | Melt Enthalpy (J/g) |
|---|---|---|---|---|---|---|---|
| 1 | MAH-g-CBC2-2 | 2.7 | 0.28 | 24.0 | 131 (113) | 97 | 105 |
| 2 | MAH-g-CBC2-4 | 0.71 | 0.64 | 29.0 | 131 (113) | 95 | 103 |
| 3 | MAH-g-CBC1-1 | 13.0 | 0.47 | 23.9 | 120 (104) | 87 | 98 |
| 4 | MAH-g-CBC1-2 | 8.8 | 0.76 | 26.8 | 119 (103) | 86 | 95 |
| 5 | MAH-g-CBC3-1 | 87.6 | 0.46 | 38.3 | 136 (103) | 94 | 105 |
| 6 | MAH-g-CBC3-2 | 87.1 | 0.88 | 41.3 | 137 (102) | 95 | 96 |
| 7 | MAH-g-CBC4-1 | 24.1 | 0.54 | 49.6 | 135 (97) | 96 | 95 |
| 8 | MAH-g-CBC4-2 | 31.9 | 0.87 | 56.3 | 136 (97) | 98 | 83 |
| A | MAH-g-OBC1 | 8.0* | 0.98 | n/a | 121 | 111 | 32 |

*Measured at 2.16 kg, 190° C.

TABLE 13

Tensile properties of MAH-g-CBC and MAH-g-OBC1

| Example | Description | 2% Secant Modulus (psi) | Ult. Elongation (%) | Toughness (in * lbf) | Ult Tensile (psi) |
|---|---|---|---|---|---|
| 1 | MAH-g-CBC2-2 | 34057 | 660 | 170 | 3135 |
| 2 | MAH-g-CBC2-4 | 35700 | 697 | 188 | 3259 |
| 3 | MAH-g-CBC1-1 | 32600 | 619 | 111 | 2226 |
| 4 | MAH-g-CBC1-2 | 30550 | 645 | 125 | 2341 |
| 5 | MAH-g-CBC3-1 | 43602 | 357 | 76 | 2880 |
| 6 | MAH-g-CBC3-2 | 45819 | 391 | 85 | 2886 |
| 7 | MAH-g-CBC4-1 | 40924 | 601 | 156 | 3646 |
| 8 | MAH-g-CBC4-2 | 41958 | 601 | 158 | 3646 |
| A | MAH-g-OBC1 | 1735 | 1456 | 104 | 1073 |

Comparison of MAH-g-CBC and MAH-g-iPP1/EP1 Blends

The process of grafting iPP1/EP1 blends is the same as described for the CBCs above. The iPP1 and EP1 are dry blended prior to grafting. The formulations used for grafting MAH to iPP1/EP1 blends and CBC5 and CBC6 are shown in Table 14. Characterizations of MAH grafted iPP1/EP1 blends and CBC5 and CBC6 are shown in Table 15. Tensile properties of MAH grafted iPP1/EP1 blends and CBC5 and CBC6 are shown in Table 16.

At total C2 content of 46-48 wt %, compared to Example D [MAH-g-(EP1/iPP1 50/50 blend)], Example 9 (MAH-g-CBC5) has higher grafting level. Similarly at total C2 content of 28-29 wt %, Example 10 (MAH-g-CBC6) has higher grafting level than Example E [MAH-g-(EP1/iPP1 30/70 blend)]. More distinctively, the tensile properties of Examples 9 and 10 show significantly better elongation and toughness, whereas Examples D and E are brittle in nature.

Figure 7A:
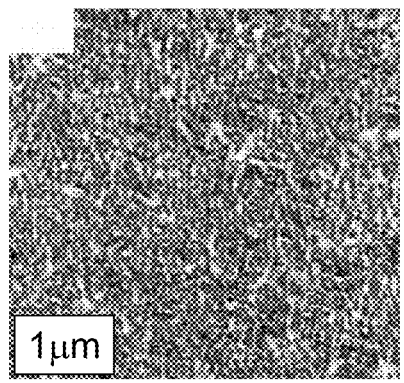
FIGS. 7A and 7B show TEM for CBC5 at 1 µm resolution and 0.2 µm resolution, respectively.
Figure 7B:
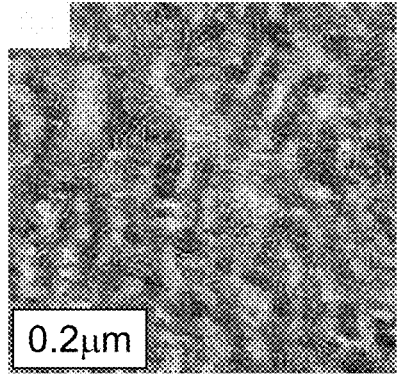
Figure 7C:
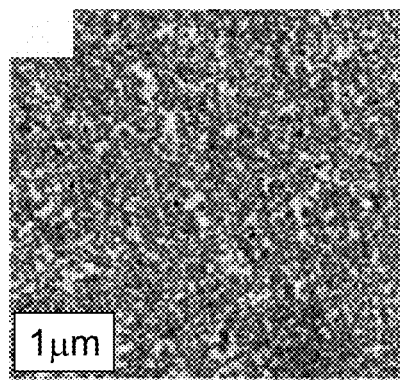
FIGS. 7C and 7D show TEM for Example 9 (MAH-g-CBC5) at 1 µm resolution and 0.2 µm resolution, respectively.
Figure 7D:
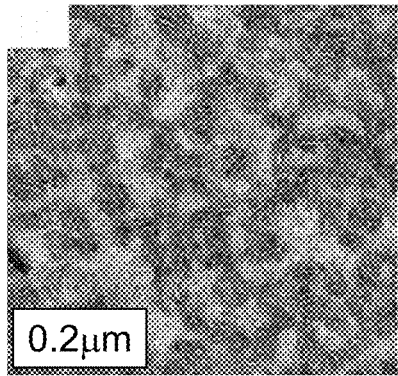
Figure 7E:
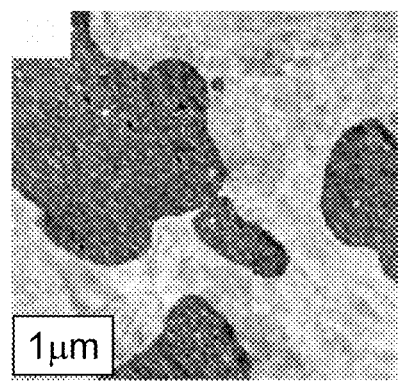
FIGS. 7E and 7F show TEM for Example D [MAH-g-(EP1/iPP1 50/50 blend)] at 1 µm resolution and 0.2 µm resolution, respectively.
Figure 7F:
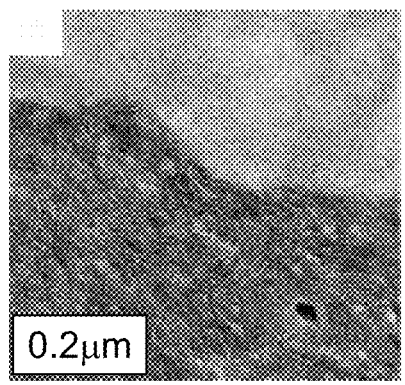
Figure 8:
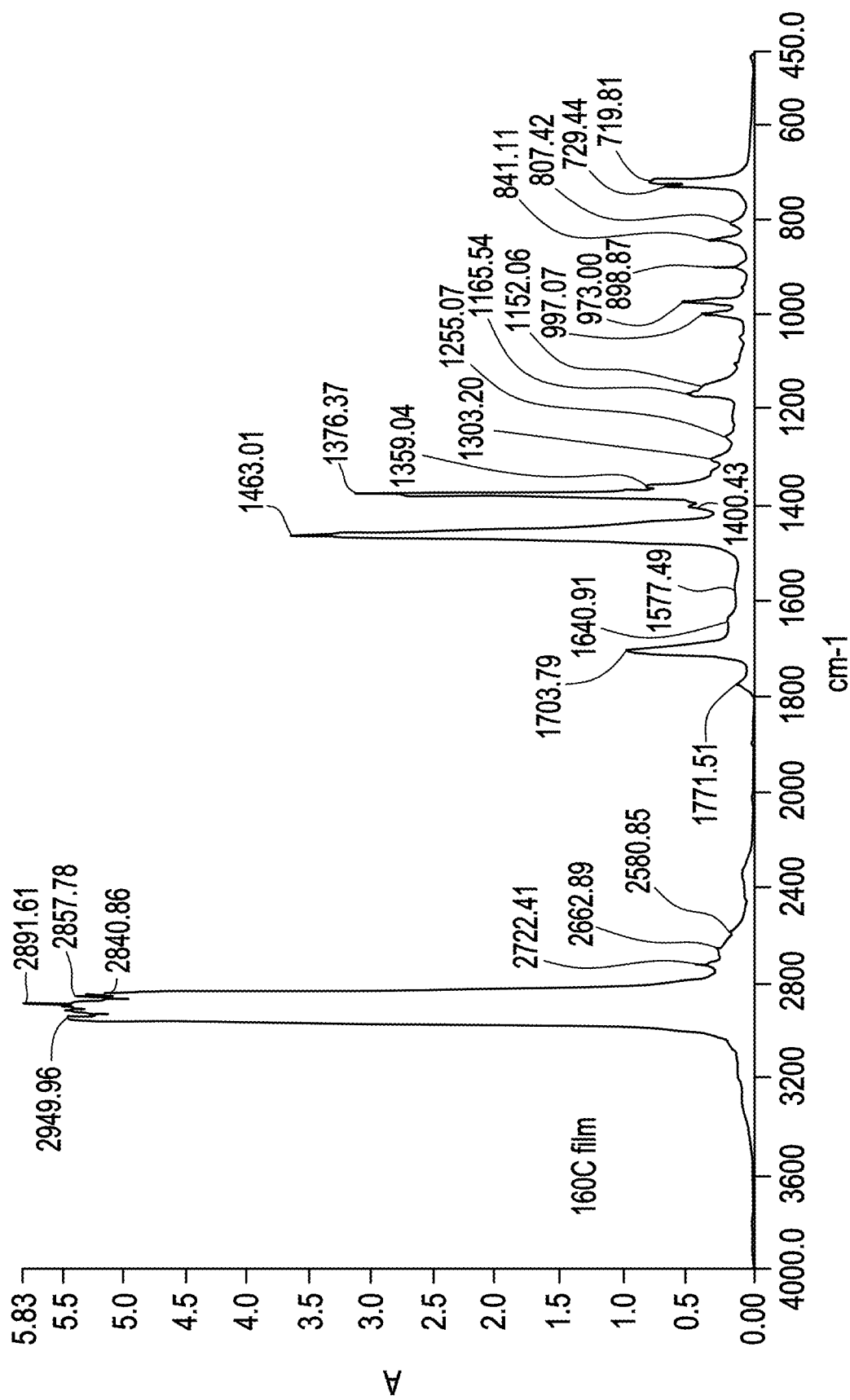
FIG. 8 shows the IR spectrum for Imide-g-CBC2-4.
Figure 9C:
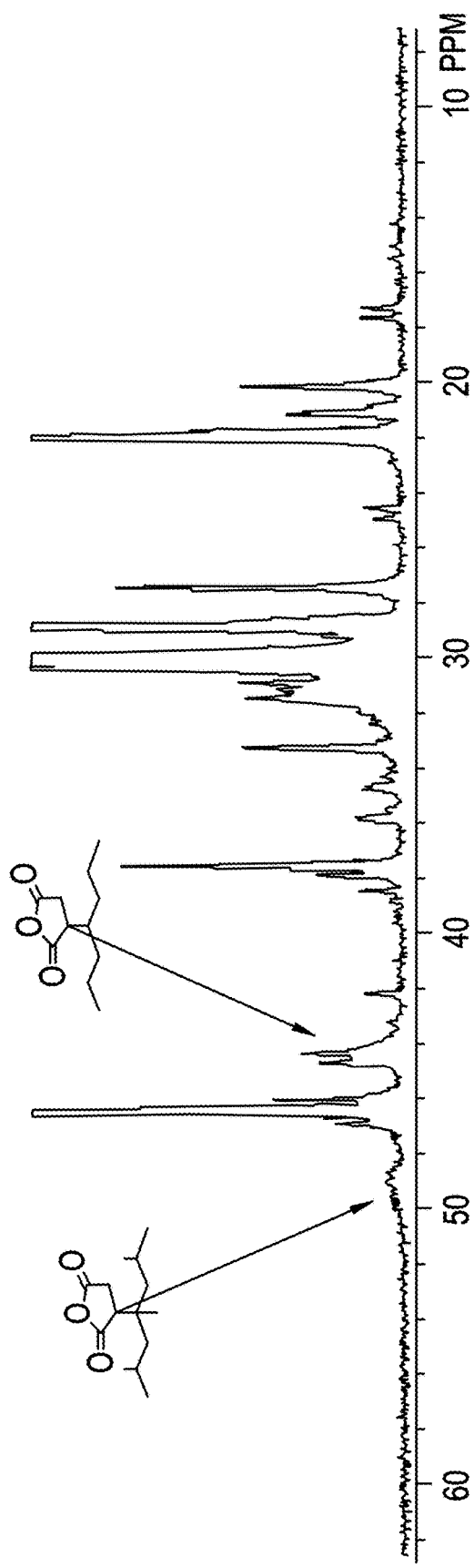
FIG. 9C shows the 13C NMR spectrum for 13C-labeled MAH grafted EP1/iPP1 50/50 blend.
Figure 9D:
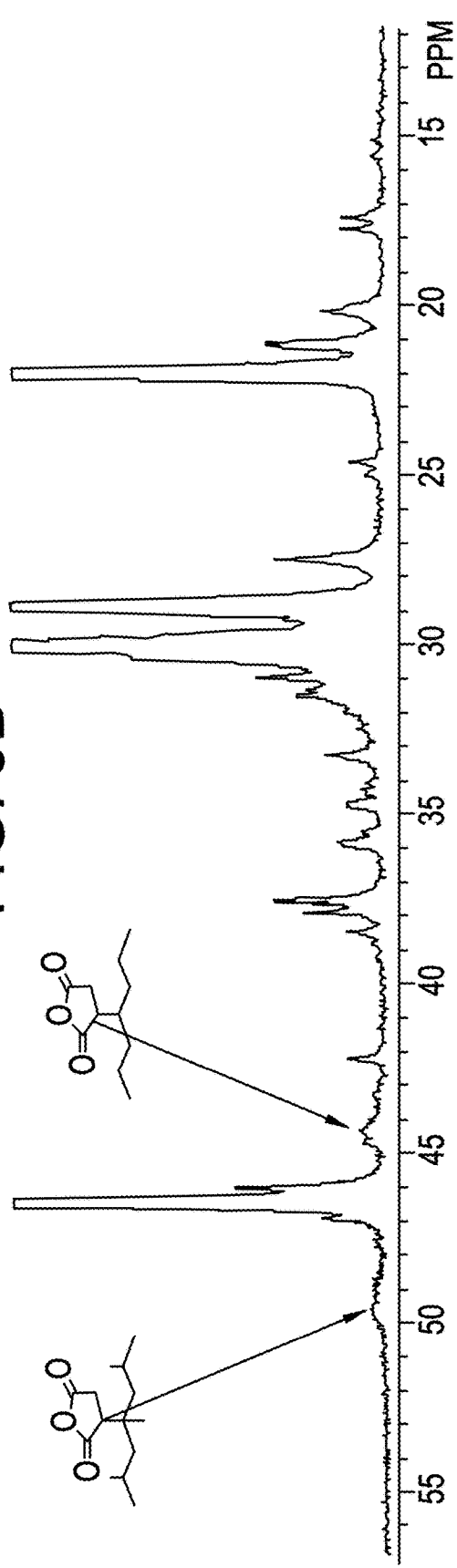
FIG. 9D shows the 13C NMR spectrum for 13C-labeled MAH grafted EP1/iPP1 30/70 blend.

FIGS. 7A and 7B show the TEM images for CBC5 at 1 μm resolution and 0.2 μm resolution, respectively. FIGS. 7C and 7D show the TEM images for Example 9 (MAH-g-CBC5) at 1 μm resolution and 0.2 μm resolution, respectively. FIGS. 7E and 7F show TEM for Example D [MAH-g-(EP1/iPP1 50/50 blend)] at 1 μm resolution and 0.2 μm resolution, respectively. Based on the staining applied, the darker domains are PE and the lighter domains are PP. The very small PE domain size of CBC5 and Example 9 (MAH-g-CBC5) strongly suggests the presence of high levels of block copolymers which acted to compatibilize the PP and PE phases. The nano-scale nature indicates that the block copolymer is effective in reducing the PE domains. In contrast, Example D [MAH-g-(EP1/iPP1 50/50 blend)] exhibits coarse and phase separated morphologies with more than an order of magnitude higher domain size.

TABLE 14

MAH grafting formulation and resin properties

| Example | Description | Polymer | MAH | POX | MEK |
|---|---|---|---|---|---|
| 9 | MAH-g-CBC5 | 95.8 | 2.00 | 0.20 | 2.00 |
| 10 | MAH-g-CBC6 | 95.8 | 2.00 | 0.20 | 2.00 |
| B | MAH-g-EP1 | 95.8 | 2.00 | 0.20 | 2.00 |
| C | MAH-g-iPP1 | 95.8 | 2.00 | 0.20 | 2.00 |
| D | MAH-g-(EP1/iPP1 50/50 blend) | 95.8 | 2.00 | 0.20 | 2.00 |
| E | MAH-g-(EP1/iPP1 30/70 blend) | 95.8 | 2.00 | 0.20 | 2.00 |

TABLE 15

Characterizations of MAH-g-CBC and MAH-g-iPP1/EP1 blends

| Example | Description | MFR before grafting (2.16 kg, 230° C.) | MFR (2.16 kg, 230° C.) | Grafting level MAH wt % | Wt % PP From HTLC Separation | Total Wt % $C_2$ | Tm (° C.) Peak 1 (Peak 2) | Tc (° C.) | Melt Enthalpy (J/g) | Oligomer (ppm) |
|---|---|---|---|---|---|---|---|---|---|---|
| 9 | MAH-g-CBC5 | 7.5 | 3.1 | 0.98 | 32.4 | 48.3 | 128 (104) | 90 | 90 | 264 |
| 10 | MAH-g-CBC6 | 4.9 | 39.1 | 0.90 | 49.1 | 29.4 | 136 (101) | 102 | 90 | 91 |
| B | MAH-g-EP1 | 6.2 | 1.2 | 1.24 | 0 | 92 | 105 | 92 | 113 | 135 |
| C | MAH-g-iPP1 | 7.7 | 195 | 0.45 | 100 | 0.9 | 131 | 95 | 78 | 117 |
| D | MAH-g-(EP1/iPP1 50/50 blend) | 6.9* | 8.6 | 0.94 | 57.3 | 46.2 | 131 (104) | 93 | 99 | 124 |
| E | MAH-g-(EP1/iPP1 30/70 blend) | 7.2* | 33.7 | 0.74 | 78.1 | 28.2 | 131 (103) | 94 | 88 | 141 |

*Calculated according to logarithmic additivity rule.

TABLE 16

Tensile properties of MAH-g-CBC and MAH-g-iPP1/EP1 blends

| Example | Description | 2% Secant Modulus (psi) | Ult. Elongation (%) | Toughness (in * lbf) | Ult Tensile (psi) |
|---|---|---|---|---|---|
| 9 | MAH-g-CBC5 | 30672 | 604 | 119 | 2157 |
| 10 | MAH-g-CBC6 | 47848 | 495 | 130 | 3007 |
| B | MAH-g-EP1 | 28413 | 588 | 121 | 1906 |
| C | MAH-g-iPP1 | 79019 | 184 | 49 | 4149 |
| D | MAH-g-(EP1/iPP1 50/50 blend) | 45068 | 58 | 15 | 2405 |
| E | MAH-g-(EP1/iPP1 30/70 blend) | 50693 | 17 | 5 | 3008 |

Preparation of MAH-g-BC

The process of grafting iPP1/EP1 blends is the same as described for the CBCs above. The formulations used for grafting MAH to BC are shown in Table 17. Characterizations of MAH-g-BC are shown in Table 18. Compared to Example A, inventive Examples 11 and 12 have higher melting temperatures and higher melt enthalpy than Example A.

TABLE 17

MAH grafting formulation and resin properties

| Example | ID | Description | Polymer | MAH | POX | MEK |
|---|---|---|---|---|---|---|
| 11 | 12022-38587 | MAH-g-BC1 | 95.8 | 2.00 | 0.20 | 2.00 |
| 12 | 12022-38588 | MAH-g-BC2 | 95.8 | 2.00 | 0.20 | 2.00 |

TABLE 18

Characterizations of MAH-g-CBC and MAH-g-iPP1/EP1 blends

| Example | Description | MFR (2.16 kg, 230° C.) | Grafting level MAH wt % | Wt % PP From HTLC Separation | Total Wt % $C_2$ | Tm (° C.) Peak 1 (Peak 2) | Tc (° C.) | Melt Enthalpy (J/g) | Oligomer (ppm) |
|---|---|---|---|---|---|---|---|---|---|
| 11 | MAH-g-BC1 | 15.9 | 1.01 | 34.9 | 33.8 | 140 (42) | 98 | 62 | 198 |
| 12 | MAH-g-BC2 | 52.6 | 0.78 | 33.0 | 20.5 | 138 | 98 | 43 | 196 |
| A | MAH-g-OBC1 | 8.0* | 0.98 | n/a | 57.4 | 121 | 111 | 32 | n/m |

Grafting $^{13}$C Labeled Maleic Anhydride

The unit used to graft $^{13}$C-labeled maleic anhydride to the polyolefin resin was a Thermo Haake MiniLab Rheomex model CTW5 with synchronous rotating screws. The temperature set point was 180° C. and screw rotation speed was 150 RPM. Polyolefin resin (CBC5, CBC6, EP1, iPP1, EP1/iPP1 50/50 blend, or EP1/iPP1 30/70 blend) was added to the mixer and allowed to melt for 5 min. For EP1/iPP1 blend experiments, the pellets were dry-blended before adding to the mixer. Subsequently, 2,3-$^{13}$C$_2$-maleic anhydride was added and allowed to mix for 2 min. Afterwards, 2,5-di-t-butylperoxy-2,5-dimethylhexane was added as a 10 wt % mixture in mineral oil and mixing was continued for 6 min. The amount of each component is listed in Table 19. After reaction the collected product was dissolved in boiling xylene to give a 5 wt % solution and then precipitated into five volumes of methanol. The solids were collected by vacuum filtration and dried in a vacuum oven at 145° C. The products and base resins were analyzed by $^{13}$C NMR spectroscopy.

The total C2 wt % of CBC5, CBC6, EP1 and iPP1 used for MAH grafting is determined by $^{13}$C NMR and the results are listed in Table 19. The total C2 wt % of EP1/iPP1 50/50 blend and EP1/iPP1 30/70 blend is calculated based on the blend ratio and total C2 wt % of EP1 and iPP1 determined by $^{13}$C NMR. The ethylene/propylene (E/P) molar ratio is calculated from the total C2 wt % and shown in Table 19.

$^{13}$C NMR spectroscopy is used to determine the location of the graft site of the $^{13}$C-MAH, whether at an ethylene site or a propylene site. The E-graft/P-graft mol ratio determined by $^{13}$C NMR is shown in Table 19. Since the molar ratios of E-graft/P-graft in the grafted resins are considerably larger than the corresponding molar ratios of E/P sites in the base resins, this indicates that there is a preference for grafting at an ethylene site. The E/P graft selectivity is calculated by dividing E-graft/P-graft mol ratio with E/P mol ratio. The E/P graft selectivity being greater than 1 indicates that there is a preference for grafting at an ethylene site. Although the tertiary C—H bond at a propylene site would be expected to react with the peroxide faster than a secondary C—H bond at an ethylene site, it is hypothesized that the tertiary free radical intermediate formed at a propylene site exhibits a greater preference for chain scission rather than grafting, whereas the secondary free radical intermediate exhibits a greater preference for grafting. Surprisingly, the E/P graft selectivity for CBC is greater than that for corresponding EP1/iPP1 blends. This contrast in graft selectivity is hypothesized to be caused by the unique morphology of the CBC.

TABLE 19

Results of analysis by $^{13}$C NMR spectroscopy

| Example | Description | Haake Feed composition, g | | | Total C2 wt % by $^{13}$C NMR | E/P mol ratio | E-graft/ P-graft mol ratio | E/P graft selectivity |
|---|---|---|---|---|---|---|---|---|
| | | Resin | $^{13}$C-MAH | Peroxide | | | | |
| 13 | $^{13}$C-MAH-g-CBC-5 | 5.0 | 0.10 | 0.01 | 48.3 | 1.40 | Infinite** | Infinite |
| 14 | $^{13}$C-MAH-g-CBC-6 | 5.0 | 0.10 | 0.01 | 29.1 | 0.62 | 1.8 | 2.9 |
| F | $^{13}$C-MAH-g-EP1 | 5.0 | 0.07 | 0.01 | 91.8 | 16.86 | n/a | n/a |
| G | $^{13}$C-MAH-g-iPP1 | 5.0 | 0.10 | 0.01 | 1.4 | 0.02 | n/a | n/a |
| H | $^{13}$C-MAH-g-EP1/iPP1 50/50 blend | 5.0 | 0.10 | 0.01 | 46.6* | 1.31 | 3.1 | 2.4 |
| I | $^{13}$C-MAH-g-EP1/iPP1 30/70 blend | 5.0 | 0.09 | 0.01 | 28.5* | 0.60 | 1.1 | 1.8 |

*Calculated value;
**zero P-graft as determined by $^{13}$C-MAH

Converting MAH- to Imide-g-CBC2 (Representative Preparation of Imide-g-CBC2)

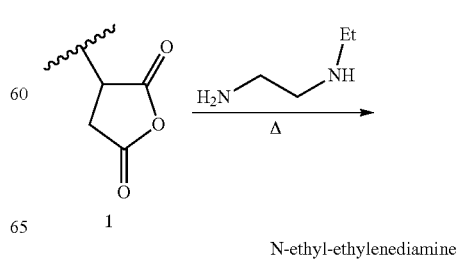

1

N-ethyl-ethylenediamine

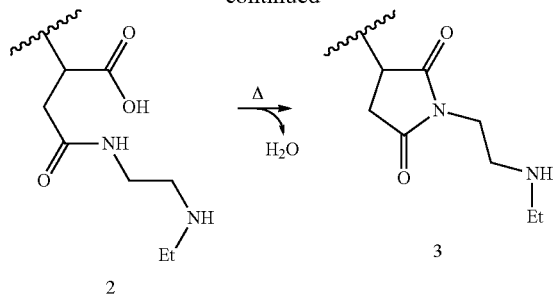

MAH-g-CBC2-2 and MAH-g-CBC2-4 are converted to imide-g-CBC2-2 and imide-g-CBC2-4, respectively. Imide-g-CBC describes the preparation of a secondary amine pendant functional group with an imide group. An imide is a functional group having two carbonyl groups bound to nitrogen. The unit used to convert MAH-g-CBC2 to DEDA grafted version is a Thermo Haake Polylab, Model 557-9301 (the drive unit) and Haake Rheomix 3000p, Model 557-1306 (with roller mixing rotors). Control is from a Dell Pentium 4 computer (Model DHM, S/N 9D56K21) running Windows 2002 with proprietary Haake software that controls automated operation of Polylab drive unit and Rheomix mixing bowls and acquires data.

For Imide-g-CBC2-4, 195 g of maleated resin (MAH-g-CBC2-4) is weighed into 16 oz., wide mouthed glass jars then warmed in an oven at 50° C. temperature for 30 minutes. Three molar equivalents of DEDA (2-ethylaminoethylamine) per mol of anhydride is added by gas-tight syringe into the jars. Specifically, 6.3 ml of DEDA (5.23 g) is added. Jars are shaken to distribute the amine, capped lightly with Teflon lined lids and returned to the oven for 1 hr. The jars are removed, shaken again, lids secured with electrical tape and placed inside a 1-gallon wide mouthed HDPE jug as a secondary container. The glass bottles are padded with brown crepe paper to keep them from rolling within the secondary jars. Lids of the secondary containers are sealed with electrical tape then put on a Stovall low profile powered roller unit set to maximum rolling speed. Jars are rolled for 2 days. When checked the next day there was still some visible "loose" liquid on the sides so returned the jars to the 50° C. oven for 2 hours. Samples are again put in 50° C. oven for at least 3 hours before running Haake unit is set to 170° C., allowed to equilibrate and the rotors are calibrated at 100 RPM rotor speed. Imbibed pellets are added to mix bowl and ran for 10 minutes after feed ram secured in closed position. The bowl is opened; sample removed and allowed to cool on Teflon sheet. Films of raw samples (about 3 mil thick) are pressed at 160° C. using Carver hydraulic press and checked by FTIR (Perkin-Elmer Spectrum One) for conversion. Samples are then dried under vacuum at 120° C. for overnight. An IR spectrum for Imide-g-CBC2-4 is shown in FIG. 7. The anhydride (1785-1790 cm-1) band is transformed to the imide band at 1700-1710 cm after reaction with the diamine. The disappearance of the anhydride band and formation of imide band indicate the reaction is complete.

Converting MAH-g-OBC1 to Imide-g-OBC1

For converting MAH-g-OBC1 to Imide-g-OBC1, 190 g of MAH-g-OBC is weighed into 16 oz., wide mouthed glass jars then warmed in an oven at 50° C. temperature for 30 minutes. 6.1 ml of DEDA (5.12 g) is added by gastight syringe into the jars. The rest follows the same procedure as converting MAH-g-CBC2 to Imide-g-CBC2.

The characterizations of Imide-g-CBC and Imide-g-OBC1 are shown in Table 20. Compared to Example J (Imide-g-OBC1), inventive Examples 15 and 16 have higher melting temperatures and higher melt enthalpy. The inventive examples in Table 20 have higher tensile modulus, toughness and ultimate tensile strength.

TABLE 20

Characterizations and tensile properties of imide grafted polymers

| Example | Description | MFR (2.16 kg, 230° C.) | Tm (° C.) Peak 1 (Peak 2) | Tc (° C.) | Melt Enthalpy (J/g) | 2% Secant Modulus (psi) | Ult. Elongation (%) | Toughness (in*lbf) | Ult Tensile (psi) |
|---|---|---|---|---|---|---|---|---|---|
| 15 | Imide-g-CBC2-2 | 0.79 | 132 (114) | 101 | 102 | 48156 | 436 | 113 | 2893 |
| 16 | Imide-g-CBC2-4 | n/m | 133 (113) | 99 | 92 | 43580 | 663 | 172 | 3433 |
| J | Imide-g-OBC1 | 0.33 | 121 | 111 | 29 | 1214 | 964 | 62 | 565 |

Preparation of Silane Grated OBC2 (VTMOS-g-OBC2)

A ZSK-92 Megacompounder with 11 barrels (45 L/D) is used to graft VTMOS on INFUSE™ 9500 (OBC2). The OBC2 resin is fed with K-Tron T-60 feeder. The barrel temperature is set at 25° C. for zone 1 and zone 2 and 190° C. for zone 3 and zone 4, 230° C. for zone 5 to 8, and 190° C. for zone 9 to 11. The die temperature is set at 190° C. A vacuum pump system is used for devolatilization at barrel 9. A minimum of 20 inches Hg is used. The VTMOS/peroxide mixture (20/1, wt/wt) is injected using an American Lewa, Inc. type EH-1 pump with a micromotion flow meter model CMP025 to measure flow. The injection point is at barrel #4. A vacuum pump system is used for devolatilization at barrel 9 and a vacuum of 20 inches Hg is used on order to minimize the concentration of volatile components and residual silane in the melt. The screw RPM is at 250 RPM and feed rate of OBC2 is 1800 lb/hr. The feed formulation is 1.90% VTMOS and 0.095% peroxide. The final VTMOS grafting level is 1.47% and melt index of VTMOS-g-OBC2 is 4.9 (2.16 kg, 190° C.).

Silane Grafting of CBC and BC

The same equipment was used for the preparation of the silane grafted polymer samples as discussed previously for the maleic anhydride grafting examples (1-8). A Coperion ZSK-25MC twin screw extruder is used for the reactive extrusion process to functionalize the base plastic resins. Polymer pellets are fed to the main extruder hopper in barrel 1 using a K-tron Model KCLQX3 loss-in-weight feeder. The liquid reactants were injected into the third barrel section of the extruder using a HPLC precision metering pump (Alltech Model 627 HPLC pump). A dialkyl organic peroxide (Luperox 101, CAS #78-63-7) is used as the initiator. The liquid feed to the extruder included a blend containing both the vinyltrimethoxysilane monomer and the organic peroxide. In order to minimize the time when the peroxide and monomer are mixed together, the peroxide was dissolved in the vinyltrimethoxysilane immediately before moving the blend to the inlet of the positive displacement pump. The HPLC injection rate was 4.0 ml/min. Typical injection pressures for the liquids were 2.56-2.78 MPa. The unreacted vinyltrimethoxysilane and volatile compounds were removed via the vacuum line-trap system at the devolatilization port in barrel 11. The vacuum system was operated at 508 mm Hg vacuum. The melt was pelletized using a GALA LPU underwater pelletization system. A two-hole die was used with 7.2° C. water temperature and a cutter speed of 3400 rpm. The polymer feed rate to the process was 11.36 kg/h with a fixed extruder screw speed of 450 rpm and a motor torque load of 63-73%.

The formulations used for grafting VTMOS to CBC and BC are shown in Table 21. The process conditions are shown in Table 22. Characterizations of Silane grafted CBC abd BC are shown in Table 23. Gel fraction of crosslinked VTMS-g-CBC, VTMS-g-BC and VTMS-g-OBC2 is hown in Table 24. Compared to Example K (VTMOS-g-OBC2), inventive Examples 17 to 19 have higher melting temperatures and higher melt enthalpy. The inventive examples in Table 23 also have higher tensile modulus and ultimate tensile strength. Significant crosslinking is developed for examples 17 and 18 as manifested by high gel fraction after cure.

TABLE 21

Silane grafting formulation and resin properties

| | | Feed (wt %) | | |
|---|---|---|---|---|
| Example | Description | Polymer | VTMOS | POX |
| 17 | VTMOS-g-CBC5 | 98.00 | 1.90 | 0.10 |
| 18 | VTMOS-g-CBC6 | 98.00 | 1.90 | 0.10 |
| 19 | VTMOS-g-BC1 | 98.00 | 1.90 | 0.10 |

TABLE 22

Process Conditions for Production of VTMOS grafted Polymer Samples

| | Sample No. | | | |
|---|---|---|---|---|
| | VTMOS-g-CBC5 | | VTMOS-g-CBC6 | |
| #1 Pellet Feed Rate [kg/h] | 11.36 | | 11.36 | |
| HPLC [ml/min] | 4.0 | | 4.0 | |
| Screw RPM | 450 | | 450 | |
| | SP | Actual | SP | Actual |
| Zone #1 [° C.] | 50 | 50 | 50 | 50 |
| Zone #2 [° C.] | 180 | 180 | 180 | 180 |
| Zone #3 [° C.] | 240 | 240 | 240 | 240 |
| Zone #4 [° C.] | 240 | 240 | 240 | 240 |
| Zone #5 [° C.] | 240 | 240 | 240 | 240 |
| Zone #6 [° C.] | 240 | 240 | 240 | 240 |
| Zone #7 [° C.] | 240 | 240 | 240 | 240 |
| Zone #8 [° C.] | 200 | 200 | 200 | 200 |
| Zone #9 [° C.] | 200 | 200 | 200 | 200 |
| Zone #10 [° C.] | 200 | 200 | 200 | 200 |
| Zone #11 [° C.] | 200 | 200 | 200 | 200 |
| Divert Valve [C] | 175 | 175 | 175 | 175 |
| Gala Die [° C.] | 150 | 150 | 150 | 150 |
| Gala RPM | | 3400 | | 3400 |
| Gala water temp (° C.) | | 7.2 | | 7.2 |
| Torque % | | 63 | | 68 |
| Die pressure (MPa) | | 2.23 | | 2.78 |

TABLE 23

Characterizations of VTMOS-g-CBC, VTMOS-g-BC and VTMOS-g-OBC2

| Example | Description | MFR (2.16 kg, 230° C.) | Grafting level VTMOS wt % | Tm (° C.) Peak 1 (Peak 2) | Tc (° C.) | Melt Enthalpy (J/g) | 2% Secant Modulus (psi) | Ult. Elongation (%) | Toughness (in*lbf) | Ult Tensile (psi) |
|---|---|---|---|---|---|---|---|---|---|---|
| 17 | VTMOS-g-CBC5 | 11.7 | 1.19 | 128 (107) | 93 | 98 | 38698 | 554 | 100 | 2103 |
| 18 | VTMOS-g-CBC6 | 35.0 | 1.06 | 139 (102) | 101 | 97 | 69214 | 329 | 73 | 3097 |
| 19 | VTMOS-g-BC1 | 8.5 | 1.27 | 141 (44) | 100 | 50 | 25687 | 186 | 27 | 1449 |
| K | VTMOS-g-OBC2 | 4.9* | 1.47 | 122** | 102** | 52** | 2606** | 1767** | 146** | 1281** |

*Measured at 2.16 kg, 190° C.
**Measured on ungrafted OBC2

TABLE 24

Gel fraction of crosslinked VTMS-g-CBC, VTMS-g-BC and VTMS-g-OBC2

| Example | Description | Gel fraction (%) |
|---|---|---|
| 17 | VTMS-g-CBC5 | 49 |
| 18 | VTMS-g-CBC6 | 39 |
| 19 | VTMS-g-BC1 | 16 |
| K | VTMS-g-OBC2 | >60 |

The invention claimed is:

1. A composition comprising an olefin-based polymer functionalized by grafting at least one functionalization agent to the olefin-based polymer, the olefin-based polymer comprising:
    (A) a crystalline block composite comprising:
        i) a block copolymer comprising a crystalline propylene-based block and a crystalline ethylene-based block;
        ii) a crystalline propylene-based polymer; and,
        iii) a crystalline ethylene-based polymer,
    wherein the crystalline propylene-based block comprises greater than 90 mol % of polymerized propylene units and the crystalline ethylene-based block comprises greater than 90 mol % of polymerized ethylene units; and
    wherein the crystalline block composite is polymerized in the presence of a chain shuttling agent.

2. The composition of claim 1 wherein the functionalization agent is selected from silane, maleic anhydride, peroxide, and amine.

3. The composition of claim 1 wherein the functionalization agent is a silane for grafting onto polymers in the crystalline block composite and having the formula $CH_2=CR—(COO)_x(C_nH_{2n})_ySiR'_3$, where R is a hydrogen atom or methyl group; x and y are 0 or 1, with the proviso that when x is 1, y is 1; n is an integer from 1 to 12 inclusive, and each R' independently is an organic group.

4. The composition of claim 1 wherein the functionalization agent is maleic anhydride for grafting onto polymers in the crystalline block composite.

5. The composition of claim 1 wherein the functionalization agent is amine for grafting onto polymers in the crystalline block composite.

* * * * *